US012461383B2

(12) United States Patent
Sasaki et al.

(10) Patent No.: US 12,461,383 B2
(45) Date of Patent: Nov. 4, 2025

(54) ACTIVE RETARDER FOR 3D IMAGE DISPLAY AND DISPLAY DEVICE

(71) Applicant: Sharp Display Technology Corporation, Kameyama (JP)

(72) Inventors: Takahiro Sasaki, Kameyama (JP); Hiromi Matsumoto, Kameyama (JP); Takashi Satoh, Kameyama (JP); Akira Sakai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/521,019

(22) Filed: Nov. 28, 2023

(65) Prior Publication Data

US 2024/0210721 A1 Jun. 27, 2024

(30) Foreign Application Priority Data

Dec. 23, 2022 (JP) ................. 2022-206835

(51) Int. Cl.
| | | |
|---|---|---|
| *G02B 30/25* | (2020.01) | |
| *G02B 30/00* | (2020.01) | |
| *G02B 30/31* | (2020.01) | |
| *G02F 1/1335* | (2006.01) | |
| *G02F 1/1339* | (2006.01) | |
| *G02F 1/1347* | (2006.01) | |

(52) U.S. Cl.
CPC ............ *G02B 30/25* (2020.01); *G02B 30/00* (2020.01); *G02B 30/31* (2020.01); *G02F 1/133512* (2013.01); *G02F 1/1339* (2013.01); *G02F 1/13394* (2013.01); *G02F 1/1347* (2013.01)

(58) Field of Classification Search
CPC ............ G02B 30/31; G02F 1/133512; G02F 1/13394; G02F 1/13396; G02F 1/13471
See application file for complete search history.

(56) References Cited

U.S. PATENT DOCUMENTS

| | | | |
|---|---|---|---|
| 2002/0039166 A1* | 4/2002 | Song ................. | G02F 1/133753 349/156 |
| 2007/0229951 A1 | 10/2007 | Jung et al. | |
| 2012/0105789 A1* | 5/2012 | Lin ...................... | G02F 1/13392 349/155 |
| 2015/0268479 A1* | 9/2015 | Woodgate ............ | G02B 6/0035 359/462 |
| 2016/0048029 A1* | 2/2016 | An ...................... | H04N 13/356 349/33 |

(Continued)

FOREIGN PATENT DOCUMENTS

| | | | | |
|---|---|---|---|---|
| CN | 105467694 A | * | 4/2016 | ......... G02B 27/2214 |
| JP | 5426078 B2 | | 2/2014 | |

*Primary Examiner* — Jessica M Merlin
(74) *Attorney, Agent, or Firm* — ScienBiziP, P.C.

(57) ABSTRACT

Provided are an active retarder for 3D image display with an improved balance of display quality between the left and right eyes and with sufficiently reduced crosstalk, and a display device using the same. The active retarder for 3D image display, the active retarder including: an optical laminate that includes: a pair of substrates; a pair of electrodes disposed between the pair of substrates; a liquid crystal layer formed from a liquid crystal material containing liquid crystal molecules; columnar spacers; and light-blocking components each shielding the corresponding columnar spacer from light limitedly.

17 Claims, 20 Drawing Sheets

(56) References Cited

U.S. PATENT DOCUMENTS

2017/0208320 A1* 7/2017 Suzuki ................. H04N 13/373
2018/0341141 A1* 11/2018 Lin ................... G02F 1/133514
2022/0268974 A1* 8/2022 Weindorf ............. G02B 5/0278

* cited by examiner

FIG. 18
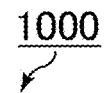
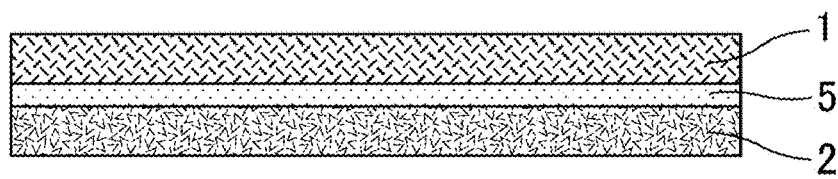
FIG. 19
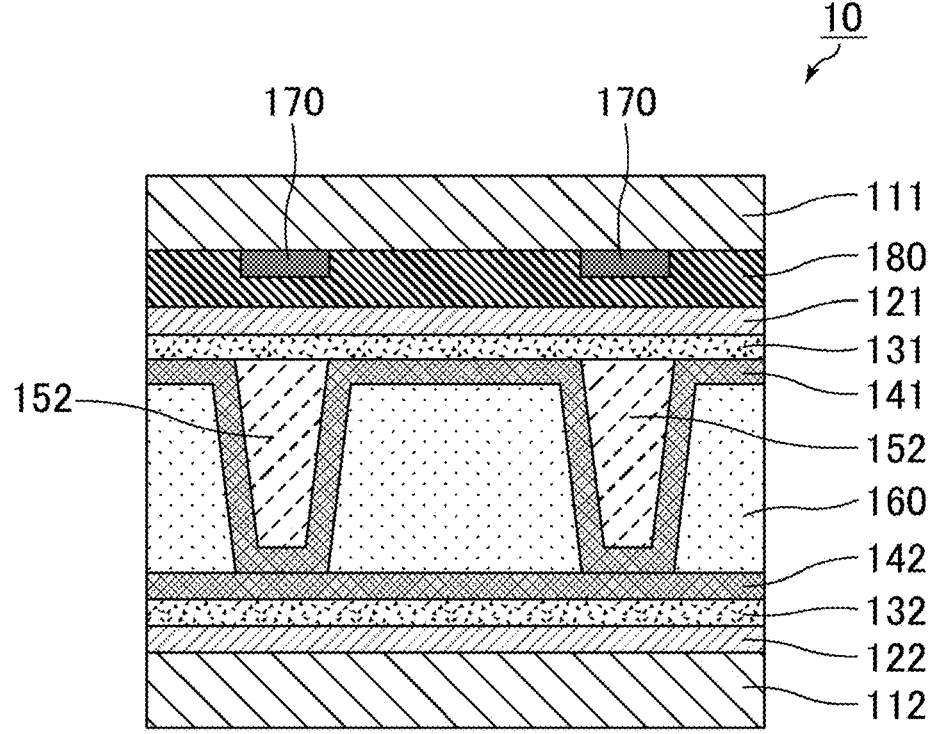
FIG. 20
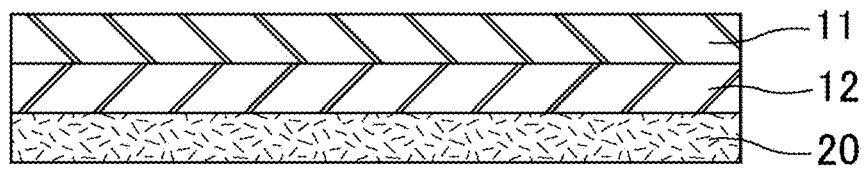

Example 5-1 | Example 4-1

Example 5-2 | Example 4-4

ACTIVE RETARDER FOR 3D IMAGE DISPLAY AND DISPLAY DEVICE

CROSS-REFERENCE TO RELATED APPLICATIONS

The present application claims priority under 35 U.S.C. § 119 to Japanese Patent Application No. 2022-206835 filed on Dec. 23, 2022, the contents of which are incorporated herein by reference in their entirety.

BACKGROUND OF THE INVENTION

Field of the Invention

The following disclosure relates to active retarders for 3D image display and display devices.

Description of Related Art

Development of various image processing technologies in recent years has been accompanied by development of technologies that realize three-dimensional stereoscopic images (called 3D images). 3D image technologies are expected to be applied to a great variety of fields such as information communication, broadcasting, medical care, education, training, military, games, animation, virtual reality, CAD, and industrial technology.

Display devices for 3D images include those based on a system using glasses and those based on a system not using glasses. Examples of the system using glasses include a shutter system that displays, while rapidly switching, images intended for the right eye and images intended for the left eye, and alternately blocking the left eye and the right eye in synchronization with the switching; and a polarizing glasses system that changes the polarization state of light between images intended for the right eye and images intended for the left eye. An example of the polarizing glasses system that has recently been attracting attention is a system that time-divisionally switches the polarization state of light between images intended for the right eye and images intended for the left eye.

Conventional display devices, however, cause a crosstalk phenomenon where an image intended for the right eye and an image intended for the left eye are displayed in combination without being completely separated. In view of this phenomenon, JP 5426078 B suggests a device that reduces crosstalk by controlling the image display and the timing to change the polarization direction of incident light.

BRIEF SUMMARY OF THE INVENTION

FIG. 31 is a schematic view of a mechanism in which a conventional active retarder-type display device 1000R for 3D images enables observation of images. The display device 1000R includes, from the viewing surface side, an active retarder 1R, an image display panel 2R, and a backlight 3 (not shown). The image display panel 2R sequentially displays images G (images intended for the right eye and images intended for the left eye) by time-based switching, and the active retarder 1R controls the polarization state for each image. The viewer uses polarizing glasses 4 to see images from the active retarder 1R. The polarizing glasses 4 are designed to transmit polarized light for images intended for the right eye R (G) through the right eye part and transmitting polarized light for images intended for the left eye L (G) through the left eye part, so that the viewer sees a 3D image.

The active retarder 1R typically has a structure including a liquid crystal layer between a pair of substrates, and employs an electrically controlled birefringence (ECB) mode that controls the initial alignment direction of liquid crystal molecules to be parallel to the substrates. A typical liquid crystal layer includes columnar spacers (also referred to as photospacers) for control of its thickness (also referred to as cell thickness or cell gap).

The studies made by the present inventor, however, revealed that the conventional display device 1000R sometimes fails to provide the desired 3D display and involves issues of crosstalk and the balance of display quality between the left and right eyes (see Comparative Example 1 described later). The present inventor made further studies and then found that the issues are mainly caused by the difference in transmission and blocking of light for the left and right eyes by the active retarder 1R.

The device disclosed in JP 5426078 B is intended to reduce crosstalk by changing the driving timings, and the document nowhere mentions consideration on issues relating to the retarder itself.

In response to the above issues, an object of the present invention is to provide an active retarder for 3D image display with an improved balance of display quality between the left and right eyes and sufficiently reduced crosstalk; and a display device using the same.

(1) One embodiment of the present invention is directed to an active retarder for 3D image display, the active retarder including an optical laminate that includes: a pair of substrates; a pair of electrodes disposed between the pair of substrates; a liquid crystal layer formed from a liquid crystal material containing liquid crystal molecules; columnar spacers; and light-blocking components each shielding the corresponding columnar spacer from light limitedly.

(2) In an embodiment of the present invention, the active retarder includes the structure (1), and the light-blocking components include light-blocking parts that overlap the corresponding columnar spacers in a plan view.

(3) In an embodiment of the present invention, the active retarder includes the structure (1) or (2), and the columnar spacers are formed using a light blocker and serve as the light-blocking components.

(4) In an embodiment of the present invention, the active retarder includes the structure (1), (2), or (3), and the light-blocking components are arranged in a dot pattern in a plan view correspondingly to the columnar spacers that are arranged in a dot pattern in a plan view.

(5) In an embodiment of the present invention, the active retarder includes the structure (4), and the columnar spacers include at least one of a columnar spacer having a circular shape in a plan view and a columnar spacer having a rounded rectangular shape in a plan view.

(6) In an embodiment of the present invention, the active retarder includes the structure (1), (2), (3), (4), or (5), the columnar spacers are arranged randomly.

(7) In an embodiment of the present invention, the active retarder includes the structure (1), (2), or (3), the columnar spacers are formed on a side of one of the pair of substrates, and the columnar spacers include: a first spacer disposed in a state where, in a cross-sectional view, the liquid crystal layer is present between the first spacer and the other of the pair of substrates; and a second spacer other than the first spacer.

(8) In an embodiment of the present invention, the active retarder includes the structure (1), (2), (3), or (4), and in a plan view, unit regions with the same arrangement pattern of the columnar spacers are disposed with constant repeating pitches and the columnar spacers are disposed randomly within one of the unit regions.

(9) In an embodiment of the present invention, the active retarder includes the structure (1), (2), (3), (4), or (5), and the liquid crystal molecules satisfy the following inequality (1):

$$K_{11} \geq \gamma_1 / \{(\Delta\varepsilon)^2 \times 1.3 \times 10^{11}\} \quad (1)$$

where $K_{11}$ represents a splay elastic constant (pN) of the liquid crystal molecules; $\gamma_1$ represents a rotational viscosity coefficient (mPa·sec) of the liquid crystal material; and $\Delta\varepsilon$ represents an anisotropy of dielectric constant of the liquid crystal molecules.

(10) In an embodiment of the present invention, the active retarder includes the structure (1), (2), (3), (4), (5), or (6), and the active retarder is driven in an ECB mode.

(11) Another aspect of the present invention is directed to a display device including: an image display panel including pixels; and the active retarder for 3D image display including the structure (1), (2), (3), (4), (5), (6), or (7).

(12) In an embodiment of the present invention, the display device includes the structure (8), and further includes a backlight.

(13) In an embodiment of the present invention, the display device includes the structure (8) or (9), in a plan view, unit regions with the same arrangement pattern of the columnar spacers are disposed with constant repeating pitches and the columnar spacers are disposed randomly within one of the unit regions, and a length of a pitch included in the repeating pitches and parallel to a long side A of a display region of the display device is not an integer multiple of a length of a pitch included in pixel pitches of the image display panel and parallel to the long side A.

(14) In an embodiment of the present invention, the display device includes the structure (8), (9), or (10), and a light diffusing adhesive layer is disposed between the image display panel and the active retarder for 3D image display.

(15) In an embodiment of the present invention, the display device includes the structure (8), (9), (10), or (11), the image display panel is configured to sequentially display an image intended for the right eye and an image intended for the left eye by time-based switching, and the active retarder for 3D image display is configured to control application of voltage to the liquid crystal layer in synchronization with the time-based switching and change a polarization state of light between an image intended for the right eye and an image intended for the left eye.

(16) In an embodiment of the present invention, the display device includes the structure (12), the display device is configured to display one of the image intended for the right eye and the image intended for the left eye in a normally white mode and display the other of the image intended for the right eye and the image intended for the left eye in a normally black mode.

The present invention can provide an active retarder for 3D image display with an improved balance of display quality between the left and right eyes and with sufficiently reduced crosstalk; and a display device using the same.

BRIEF DESCRIPTION OF THE DRAWINGS

FIG. 1 is a schematic cross-sectional view of an active retarder for 3D image display of Embodiment 1 and the like.

FIG. 2 is a schematic cross-sectional view of an optical laminate in the active retarder for 3D image display of Embodiment 1 and the like.

FIG. 3 is a schematic plan view showing arrangement of columnar spacers in Embodiment 1 and the like.

FIG. 4 is a schematic cross-sectional view of a display device of Embodiment 1 and the like.

FIG. 7 is a schematic view showing optical settings in the display device of Embodiment 1 and the like.

FIG. 8 is a schematic view showing optical settings in the display device of Embodiment 1 and the like.

FIG. 18 is a schematic cross-sectional view of an active retarder for 3D image display of Embodiment 6.

FIG. 19 is a schematic cross-sectional view of an optical laminate in an active retarder for 3D image display of Embodiment 7.

FIG. 20 is a schematic cross-sectional view of an active retarder for 3D image display of Embodiment 8.

DETAILED DESCRIPTION OF THE INVENTION

Definition of Terms

Figure 1:
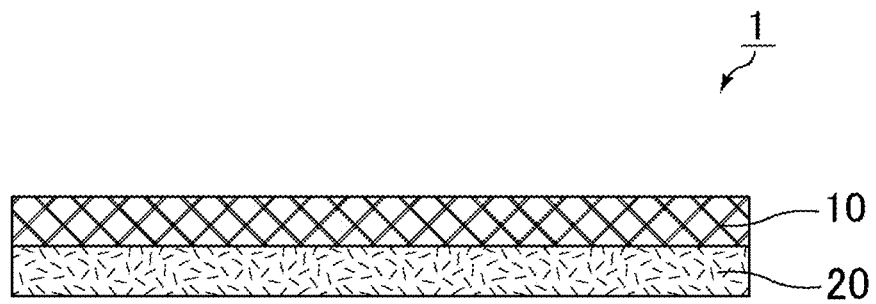

The "viewing surface side" herein means the side closer to the screen (display surface) of a display device or an active retarder. The "back surface side" herein means the side farther from the screen (display surface) of the display device or the active retarder.

Being "parallel" means that an angle (absolute value) between objects in question falls within the range of 0°+10°. The angle preferably falls within the range of 0°+5°, more preferably within the range of 0°+3°, still more preferably within the range of 0°+1°, particularly preferably 0° (perfectly parallel).

Being "perpendicular" means that an angle (absolute value) formed between objects in question falls within the range of 90°+10°. The angle preferably falls within the range of 90°+5°, more preferably within the range of 90°+3°, still more preferably within the range of 90°+1°, particularly preferably 90° (perfectly perpendicular).

An angle is a value measured in a plan view of a display device or an active retarder. For example, a state where two straight lines (including axes, directions, and ridges) are perpendicular means that they are perpendicular in a plan view of a display device or an active retarder.

A phase difference plate means one that introduces an in-plane phase difference Ro (absolute value |Ro|) or a thickness direction phase difference Rth (absolute value |Rth|) of 10 nm or more, preferably 20 nm or more.

The in-plane phase difference Ro is defined by the equation: Ro=(ns−nf) d.

The thickness direction phase difference Rth is defined by the equation: Rth={nz−(nx+ny)/2}d.

ns represents nx or ny, whichever is larger, while nf represents nx or ny, whichever is smaller.

nx represents the principle refractive index in the slow axis direction in the plane of the phase difference plate.

ny represents the principle refractive index in the fast axis direction in the plane of the phase difference plate.

nz represents the principle refractive index in an out-of-plane direction, i.e., a direction vertical to a surface of the phase difference plate.

d represents the thickness of the phase difference plate.

The measurement wavelength for a principle refractive index, a phase difference, or other optical parameters is 550 nm, unless otherwise specified.

An axis azimuth means, unless otherwise specified, an azimuth at which an absorption axis (reflection axis) of a polarizing plate or a slow axis of a phase difference plate lies. The slow axis of a phase difference plate means an in-plane slow axis.

A light transmittance is measured by a method in conformity with JIS $K_{7375}$ (2008).

A rotational viscosity coefficient $\gamma_1$ is determinable by a method of measuring torque by generation of a magnetic field, a method of analyzing properties of transient current flowing in a liquid crystal layer, or by another method. In the present invention, a value (rotational viscosity coefficient $\gamma_1$) calculated by the method using generation of a magnetic field suitably falls within the range described later.

The method of measuring torque by generation of a magnetic field is specifically the following method.

Figure 32:
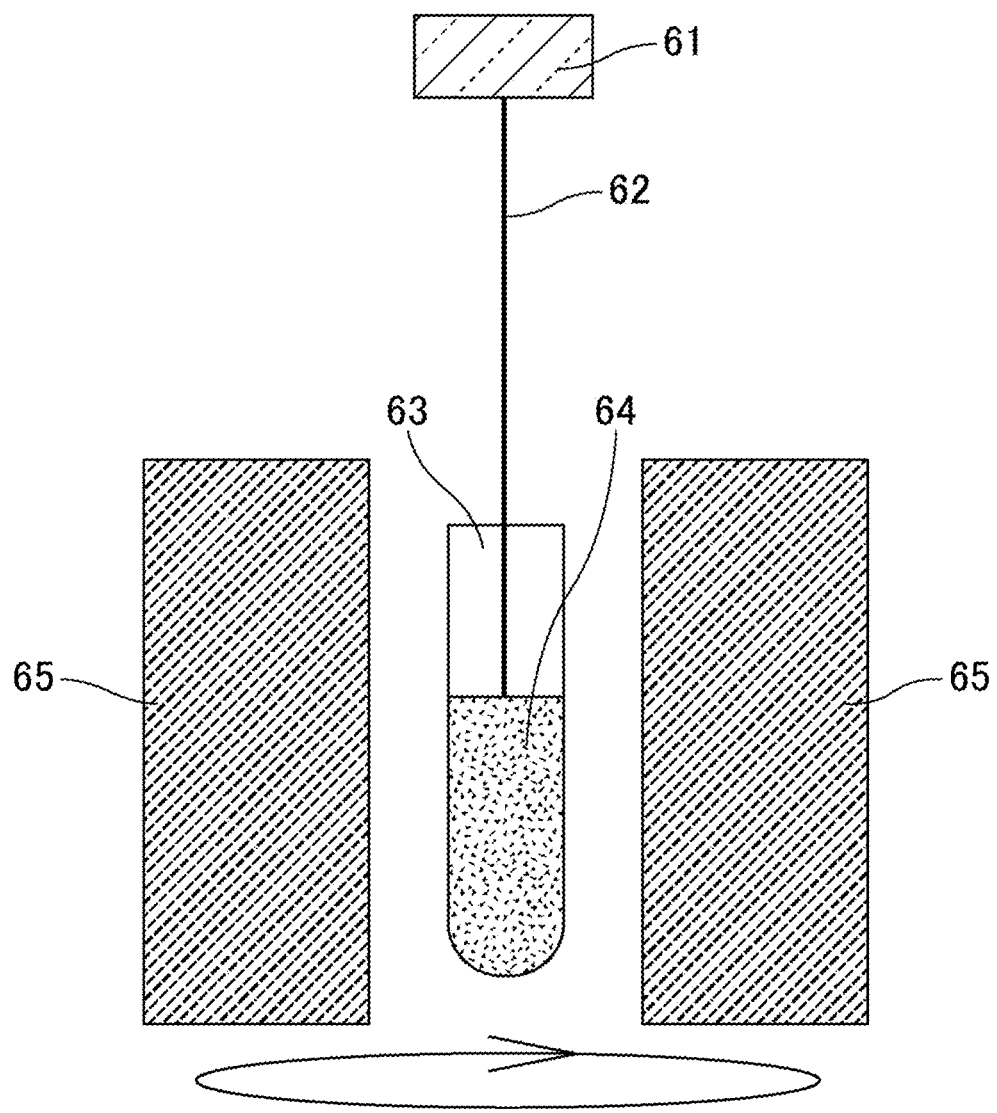
FIG. 32 is a conceptual view showing an example of a measurement device used in determination of a rotational viscosity coefficient $\gamma_1$ of a liquid crystal material.

As shown in FIG. 32, a glass tube 63 for NMR containing a sample 64 (liquid crystal material) is set in an electromagnet (magnet) 65. A glass fiber 62 connected to a torque meter 61 is immersed in the sample 64. When the temperature has stabilized, a magnetic field surrounding the glass tube 63 is generated. This aligns the liquid crystal molecules in one direction with their anisotropy of magnetic susceptibility $\Delta\chi$. The electromagnet 65 is rotated (i.e., the magnetic field is rotated) to measure a torque M. Then, the rotational viscosity coefficient $\gamma_1$ is calculated from the equation: $\gamma_1 = M/(\omega \times V)$, wherein M represents torque, $\omega$ represents an angular rate, and V represents a volume of the sample 64 (liquid crystal material). Here, torque is measured at different angular rates to calculate the rotational viscosity coefficient $\gamma_1$ since measurement of torque at one angular rate tends to result in a large error.

FIG. 32 is an example of a measurement device used in a method of measuring torque by generation of a magnetic field, i.e., a conceptual view showing an example of a measurement device used in determination of a rotational viscosity coefficient $\gamma_1$ of a liquid crystal material.

Hereinafter, embodiments of the present invention are described. The present invention is not limited to the contents of the following embodiments. The design may be modified as appropriate within the range satisfying the configuration of the present invention.

Embodiment 1

Figure 2:
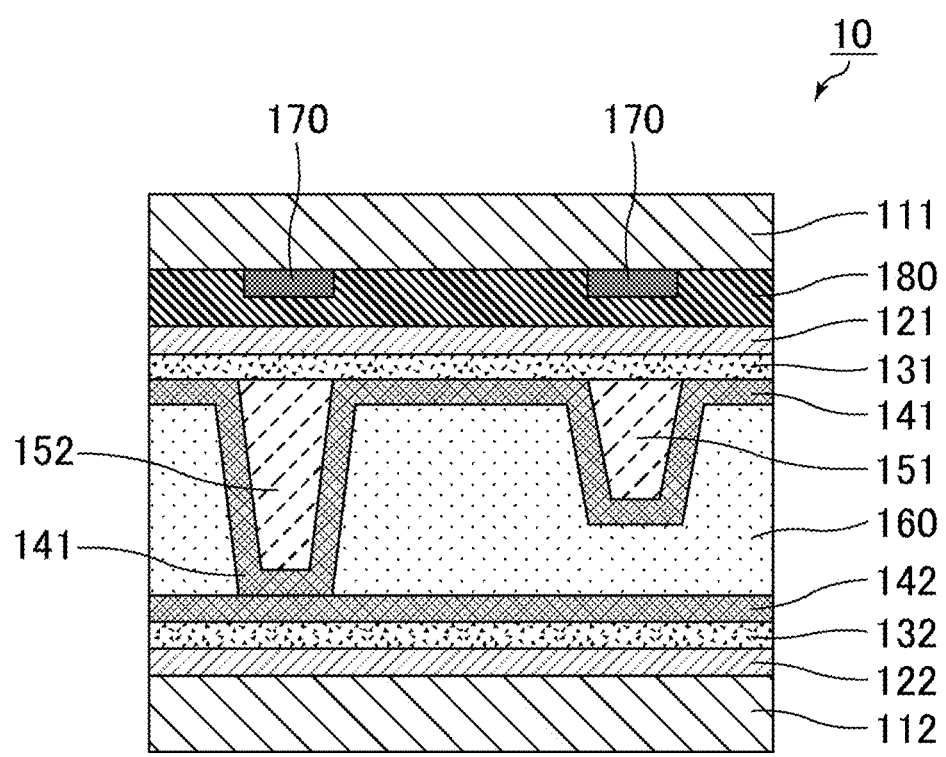

FIG. 1 is a schematic cross-sectional view of an active retarder for 3D image display (also shortened to "active retarder" hereinbelow) of the present embodiment. As shown in FIG. 1, an active retarder 1 includes an optical laminate 10 and a phase difference plate 20. FIG. 2 is a schematic cross-sectional view of the optical laminate 10 in the active retarder 1 of the present embodiment.

The optical laminate 10, as shown in FIG. 2, includes a pair of substrates 111 and 112, a pair of electrodes 121 and 122, a liquid crystal layer 160, and columnar spacers 150 (151, 152). Specifically, the optical laminate 10 includes, from the viewing surface side, a first substrate 111, a first electrode 121, a liquid crystal layer 160, a second electrode 122, and a second substrate 112. A light-blocking layer 170 that shields each of the columnar spacers 150 (151, 152) from light limitedly is disposed between the first substrate 111 and the first electrode 121. A planarization film 180 is disposed between the light-blocking layer 170 and the first electrode 121. An insulating film 131 and an alignment film 141 are disposed sequentially from the electrode side between the electrode 121 and the liquid crystal layer 160. An insulating film 132 and an alignment film 142 are disposed sequentially from the electrode side between the electrode 122 and the liquid crystal layer 160.

In the present embodiment, the columnar spacers 150 include first spacers 151 disposed like floating islands and second spacers 152 other than the first spacers 151. The second spacers 152 are disposed for control of the thickness of the liquid crystal layer 160. With the first spacers 151 disposed like floating islands, the active retarder and the display device can be resistant to surface pressing, and thus can be more useful for a display device for touch panels, for example.

The spacers "disposed like floating islands" means spacers that are disposed like floating islands in the liquid crystal layer 160. Specifically, in a cross-sectional view, the liquid crystal layer 160 is present between the first spacers 151 and the first substrate 111 or the second substrate 112. In other words, the first spacers 151 are smaller in height than the thickness of the liquid crystal layer 160 and are distinct from the second spacers 152 whose height is the same as the thickness of the liquid crystal layer 160. The first spacers 151 can also be referred to as sub-spacers and the second spacers 152 can also be referred to as main spacers.

The height of the first spacers 151 is smaller than the thickness of the liquid crystal layer 160. In other words, when the thickness of the liquid crystal layer 160 is set as 100%, the height of the first spacers 151 should be less than 100%. For example, the height of the first spacers 151 may be from 5 to 95%.

The columnar spacers 150 are formed from, for example, a resin material that is transparent to light. In the present embodiment, different types of columnar spacers with different heights are formed on the side of one of the substrates (the first substrate 111 side in the present embodiment), so that the first spacers 151 and the second spacers 152 can be formed. Specifically, for example, columnar spacers of different heights are formed on the first substrate 111 side, and then the second substrate 112 is attached to the first substrate 111 with a liquid crystal material sandwiched in between. Thus, columnar spacers smaller in height than the thickness of the liquid crystal layer 160 formed from the liquid crystal material serve as the first spacers 151, and the rest of the columnar spacers serve as the second spacers 152.

In the present embodiment, the optical laminate 10 includes the light-blocking parts (also referred to as light-blocking layer) 170, which are an example of light-blocking components each shielding the corresponding columnar spacer 150 from light limitedly. With such light-blocking components, deterioration of 3D display performance (occurrence of crosstalk) due to a shift in phase difference in the vicinity of the columnar spacers 150 can be sufficiently reduced. The expression that a light-blocking part (light-blocking component) shields the corresponding columnar spacer from light limitedly means that the corresponding columnar spacer is the main target to be shielded from light by the light-blocking part (light-blocking component). The expression encompasses cases where in a plan view, the outer edge of the light-blocking part does not coincide with the outer edge of the columnar spacer perfectly. For example, in a plan view, the outer edge of the light-blocking part may be slightly larger or slightly smaller than the outer edge of the columnar spacer. In a plan view, the light-blocking part may partially overlap the columnar spacer.

The light-blocking components in the present embodiment are the light-blocking parts 170 that overlap the corresponding columnar spacers 150 as described above. Use of "the light-blocking layer that overlaps the columnar spacers" means that, in a plan view, each of the light-blocking parts 170 overlaps 80% to 100%, preferably 85% to 100%, more preferably 90% to 100%, of the area of the corresponding columnar spacer.

The light-blocking layer 170 is formed from a light-blocking material. Examples of the light-blocking material include metal black matrices made of a metal material (also referred to as metal BMs) and resin black matrices made of a resin material (also referred to as resin BMs). Examples of the metal BMs include metal films containing aluminum, molybdenum, chromium, titanium, or an alloy of any of these metals. Examples of the resin BMs include black resists, among which a black photosensitive resin is preferred. Specific examples thereof include black photosensitive acrylic resins. The light-blocking layer 170 may be a single-layer film or a multi-layer film.

The light transmittance of the light-blocking layer 170 is preferably, for example, 0 to 1%. The thickness of the light-blocking layer 170 is not limited and is preferably, for example, 10 nm or greater and 2 μm or smaller, more preferably 50 nm or greater and 1.5 μm or smaller.

Figure 3:
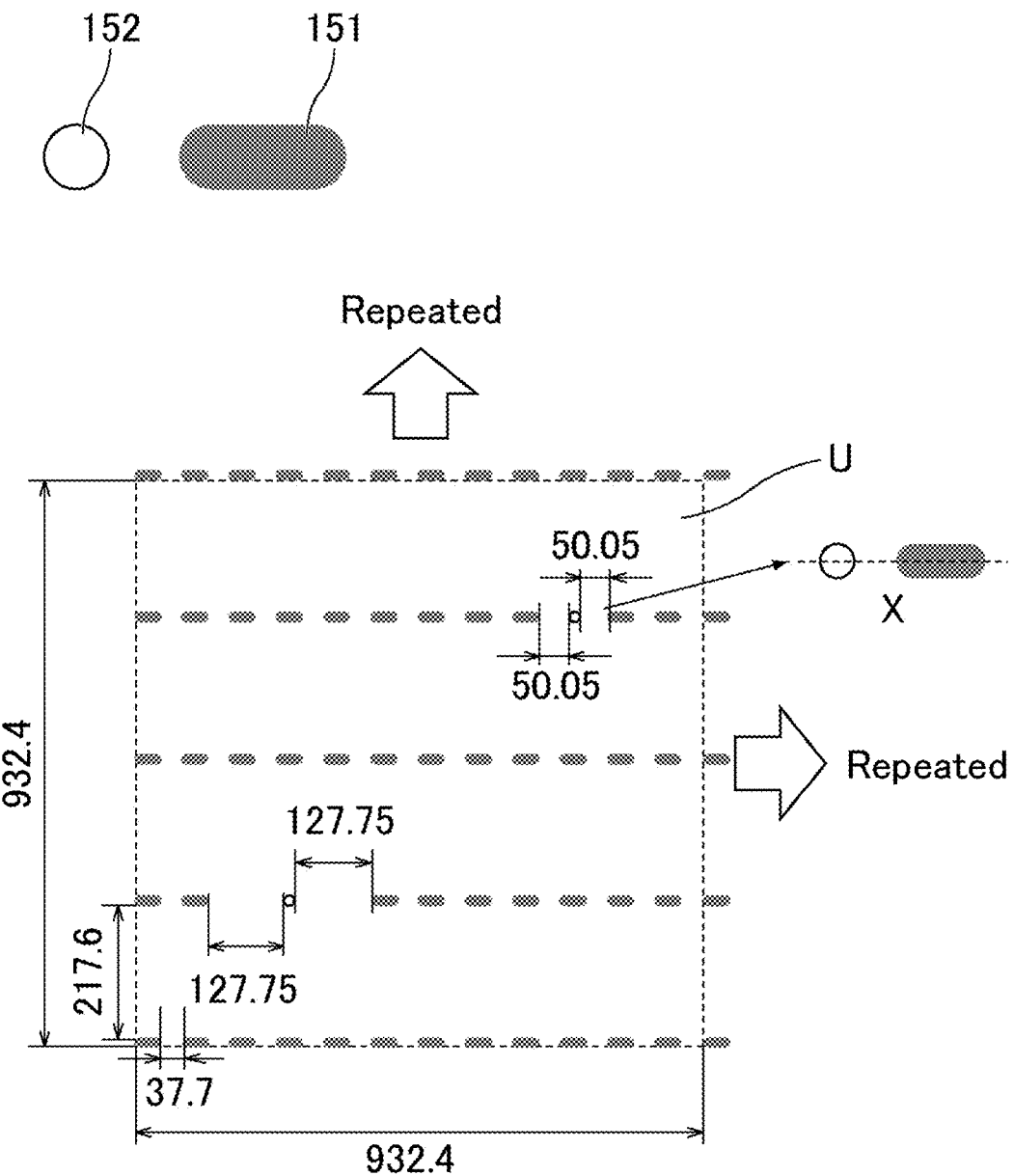

FIG. 3 is a schematic plan view showing arrangement (layout) of columnar spacers 150 in the present embodiment. The unit for numerals in FIG. 3 is μm. The horizontal direction in FIG. 3 is parallel to the long side direction of the active area (i.e., the region corresponding to the display region 1100 of the display device) of the active retarder 1. The length of the long side A of the display region 1100 of the display device is set to 59.6736 cm and the length of the pitch B that is included in the pixel pitches of the image display panel 2 and parallel to the long side A of the display region 1100 of the display device is set to 77.7 μm (see also FIG. 15 which is described later). As shown in FIG. 3, the unit of a 932.4 μm×932.4 μm square in a plan view of the liquid crystal layer 160 is taken as a base unit (also referred to as repeating unit) U, and the base unit U is repeated in the entire area of the liquid crystal layer 160. One base unit U is surrounded by a dotted line. In the base unit U, there are two second spacers 152 each having a diameter φ of about 15.3 μm and a height of 1.6 μm, and 44 first spacers 151 each having a rounded rectangular shape with a dminor axis of about 15 μm, a major axis of 40 μm, and a height of 1.3 μm and quadrant corners.

The base unit U is obtainable by, first, regularly arranging many first spacers 151 with an interval (gap) between a first spacer 151 and another first spacer 151 adjacent thereto in a horizontal direction of 37.7 μm and an interval (gap) between a first spacer 151 and another first spacer 151 adjacent thereto in a vertical direction of 217.6 μm. Then, the third, fourth, and fifth first spacers 151 (three in total) from the left in the second row from the bottom are removed, followed by disposing one second spacer 152 (second spacer 152A) at the center of the region from which the three first spacers 151 have been removed. The interval (gap) between each of first spacers 151*a* and 151*b*, which were respectively adjacent to the left and right sides of the removed (three) first spacers 151, and the second spacer 152A is 127.75 μm. The diagram X to the right in FIG. 3 shows that the second spacer 152A and the adjacent first spacers 151*a* and 151*b* are disposed such that the centers of these spacers in the vertical direction are aligned.

In addition, the third first spacer 151 (one) from the right in the fourth row from the bottom is also removed, and one second spacer 152 (second spacer 152B) is disposed at the center of the region from which the first spacer 151 has been removed. The interval (gap) between each of first spacers 151*c* and 151*d*, which were respectively adjacent to the left and right sides of the removed first spacer 151 (one), and the second spacer 152B is 50.5 μm.

As described above, the active retarder 1 of the present embodiment has an effect of reducing light leakage mainly during black display owing to light blocking by the spacers, which contributes to improvement of the balance of display quality between the left and right eyes and reduction in crosstalk. The active retarder 1 of the present embodiment thus exhibits excellent display quality.

A planarization film (also referred to as planarization layer) 180 for planarization is disposed between the light-blocking layer 170 and the first electrode 121. The planarization film 180 is preferably, for example, an organic insulating film. The organic insulating film can be, for example, an organic film with a low relative dielectric constant (relative dielectric constant ε=2 to 5) such as a photosensitive resin film or a laminate of such films. Specific examples thereof include organic films such as acrylic resin films, polyimide resin films, and novolac resin films, and laminates of such films.

The thickness of the planarization film 180 is not limited and is preferably, for example, 10 nm or greater and 5 μm or smaller, more preferably 30 nm or greater and 3 μm or smaller.

The first substrate 111 and the second substrate 112 are preferably transparent substrates. A transparent substrate may be any substrate transparent to visible light. Examples thereof include glass substrates and plastic substrates.

The first electrode 121 and the second electrode 122 are preferably transparent electrodes. A transparent electrode can be formed from, for example, a transparent conductive material such as indium tin oxide (ITO), indium zinc oxide (IZO), zinc oxide (ZnO), or tin oxide (SnO), or an alloy of any of these materials.

The first electrode 121 and the second electrode 122 are each a planar electrode disposed on the entire surface of the corresponding substrate, i.e., a solid electrode, but may each be a patterned electrode.

In the present embodiment, the active retarder 1 is driven in the ECB mode. In the ECB mode, the birefringence of the liquid crystal layer 160 is controlled by voltage application and the ECB mode is classified into a horizontal alignment type, a vertical alignment (VA) type, or a HAN type according to the initial alignment state of liquid crystal molecules. In these types, voltage is applied to the liquid crystal layer in the vertical direction. The fringe field switching (FFS) mode and the in-plane switching (IPS) mode in each of which voltage is applied in the horizontal direction can also be types of the ECB mode in a sense that the birefringence of the liquid crystal layer is controlled by voltage application. The present embodiment employs a vertical electric field type ECB mode in which positive liquid crystals are used and the initial alignment of the liquid crystal molecules is a horizontal alignment state.

The liquid crystal layer 160 is formed from a liquid crystal material that contains liquid crystal molecules 1601. The amount of light transmitted through the liquid crystal layer 160 is controllable by applying voltage to the liquid crystal layer 160 and changing the alignment state of the liquid crystal molecules 1601 according to the applied voltage. A state where the voltage applied to the liquid crystal layer 160 is lower than the threshold is referred to as a no-voltage-application state.

The liquid crystal molecules 1601 may be those whose anisotropy of dielectric constant (Δε) defined by the following formula may be positive or negative, preferably positive.

Δε=(dielectric constant in long axis direction)−(dielectric constant in short axis direction)

In the present embodiment, liquid crystal molecules with a positive anisotropy of dielectric constant are used.

Liquid crystal molecules with a positive anisotropy of dielectric constant are also referred to as positive liquid crystals. Liquid crystal molecules with a negative anisotropy of dielectric constant are also referred to as negative liquid crystals. The long axis direction of the liquid crystal molecules defines the slow axis direction.

The liquid crystal molecules 1601 also preferably satisfy the following inequality (1):

$$K_{11} \geq \gamma_1 / \{(\Delta\varepsilon)^2 \times 1.3 \times 10^{11}\} \tag{1}$$

wherein $K_{11}$ represents a splay elastic constant (pN) of the liquid crystal molecules 1601; $\gamma_1$ represents a rotational viscosity coefficient (mPa·sec) of the liquid crystal material; and Δε represents an anisotropy of dielectric constant of the liquid crystal molecules 1601. In other words, liquid crystal molecules having an anisotropy of dielectric constant Δε satisfying the relationship above is suitably selected. This can particularly shorten the response time taken for switching from the voltage-on state to the voltage-off state, achieving an active retarder 1 that can better follow ultrafast image switching.

The anisotropy of dielectric constant Δε of the liquid crystal molecules 1601 may be any value in the range satisfying the inequality (1), but is preferably 0.1 or greater from the viewpoint of better achievement of fast response. It is more preferably 0.11 or greater. From the viewpoint of cell thickness control in consideration of the actual production, it is preferably 0.22 or smaller, more preferably 0.2 or smaller.

From the viewpoint of better achievement of fast response, the splay elastic constant $K_{11}$ of the liquid crystal molecules 1601 is preferably 5 pN or greater, more preferably 10 pN or greater. From the same point of view, it is preferably 30 pN or smaller, more preferably 20 pN or smaller. The most preferred range is 10 to 20 pN.

The rotational viscosity coefficient $\gamma_1$ of the liquid crystal material constituting the liquid crystal layer 160 from the viewpoint of better achievement of fast response is preferably 100 mPa·sec (mPa·s) or smaller, more preferably 60 mPa·sec or smaller. From the same point of view, it is preferably 20 mPa·sec or greater, more preferably 30 mPa·sec or greater. The most preferred range is 30 to 60 mPa·sec.

The thickness (cell thickness) of the liquid crystal layer 160 is suitably from 100 nm to 10 μm, more preferably from 500 nm to 5 μm, still more preferably from 1 μm to 3 μm.

An alignment film is disposed on each side (viewing surface side and back surface side) of the liquid crystal layer 160. In addition, an insulating film may be disposed between an alignment film and an electrode. In the present embodiment, an insulating film 131 and an alignment film 141 are disposed between the first electrode 121 and the liquid crystal layer 160 sequentially from the electrode side, and an insulating film 132 and an alignment film 142 are disposed between the second electrode 122 and the liquid crystal layer 160 sequentially from the electrode side.

The alignment films 141 and 142 each have a function of controlling the alignment of liquid crystal molecules in the liquid crystal layer 160. When the voltage applied to the liquid crystal layer 160 is lower than the threshold voltage (including when no voltage is applied), the alignment of liquid crystal molecules in the liquid crystal layer 160 is controlled mainly by the action of the alignment films. The alignment films can be made of a material commonly used in the field of liquid crystal display panels, such as a polymer with a polyimide structure in its main chain, a polymer with a polyamic acid structure in its main chain, a polymer with a polysiloxane structure in its main chain.

The insulating films 131 and 132 are preferably, for example, inorganic insulating films. An inorganic insulating film may be, for example, a silicon nitride (SiNx) film, a silicon oxide ($SiO_2$) film, or another inorganic film (relative dielectric constant ε=5 to 7), or a laminate of such films. The thickness of each insulating film is not limited and is preferably, for example, 10 nm or greater and 500 nm or smaller, more preferably 30 nm or greater and 300 nm or smaller.

The phase difference plate 20 combined with the optical laminate 10 may be any one that introduces an in-plane phase difference Ro or a thickness direction phase difference Rth, and is preferably a uniaxial phase difference plate that introduces an in-plane phase difference Ro. The absolute value |Ro| of the in-plane phase difference Ro is suitably 50 nm or greater, more preferably 80 nm or greater, still more preferably 100 nm or greater. It is also preferably 500 nm or smaller, more preferably 400 nm or smaller, still more preferably 350 nm or smaller.

The phase difference plate 20 is suitably a λ/4 phase difference plate (also referred to as λ/4 plate) or a λ/2 phase difference plate (also referred to as λ/2 plate). In the present embodiment, a λ/4 plate is used as described below.

The phase difference plate 20 may have a single-layer structure or a laminate structure including two or more layers. When the image display panel 2 and the active retarder 1 are combined, the phase difference plate 20 is suitably disposed closer to the image display panel 2.

The thickness of the phase difference plate 20 is not limited, and is preferably, for example, 10 μm or greater and 500 μm or smaller, more preferably 50 μm or greater and 200 μm or smaller.

The phase difference plate 20 may be formed from any material. For example, a stretched polymer film, a film made of a liquid crystalline material whose alignment is fixed, or a thin plate made of an inorganic material can be used. The phase difference plate 20 may be formed by any method. When the phase difference plate 20 is formed from a polymer film, for example, a method such as solvent casting or melt extrusion can be used. Also, co-extrusion may be used to form a plurality of phase difference plates 20 simultaneously. The polymer film may or may not be stretched as long as the desired phase difference is introduced. The stretching method may be any method such as tensile stretching between rolls, compression stretching between rolls, tenter transverse uniaxial stretching, oblique stretching, vertical and transverse biaxial stretching, or special stretching where a film is stretched under the shrinkage stress of a heat shrinkable film. When the phase difference plate 20 is formed from a liquid crystalline material, for example, a method can be used such as a method of applying a liquid crystalline material to a base film having undergone an alignment treatment and fixing the alignment of the material. The method may be one including no special alignment treatment on a base film or one including removing the liquid crystalline material from the base material after the alignment fixation and transferring the material to another film, as long as the desired phase difference is introduced. A method may also be used which includes no fixation of the alignment of a liquid crystalline material. When the phase difference layer is formed from a non-liquid crystalline material, the same formation method as when the phase difference layer is formed from a liquid crystalline material may be used.

The phase difference plate 20 can appropriately be a stretched film containing a material with a positive intrinsic birefringence (intrinsic anisotropy of refractive index) as its component. Examples of the material with a positive intrinsic birefringence include polycarbonate, polysulfone, polyethersulfone, polyethylene terephthalate, polyethylene, polyvinyl alcohol, norbornene, triacetyl cellulose, diacetyl cellulose, and a cycloolefin polymer.

The production method of the optical laminate 10 and the method of producing the active retarder 1 using the optical laminate 10 and the phase difference plate 20 are not limited, and may each be a method commonly used in the field of liquid crystal panels.

The active retarder 1 of the present embodiment can be used in combination with the image display panel 2 that sequentially displays images intended for the right eye and images intended for the left eye by time-based switching. The active retarder 1 controls the voltage applied to its liquid crystal layer 160 in synchronization with the time-based switching to change the polarization state of light between the images intended for the right eye and the images intended for the left eye. In the present embodiment, the optical laminate 10 switches the phase difference between λ/2 and 0. A λ/4 plate is used as the phase difference plate 20 and the slow axis of the optical laminate 10 and the slow axis of the phase difference plate 20 are set perpendicular to each other (see FIG. 8). This allows the active retarder 1 of the present embodiment to switch the phase difference between +λ/4 and −λ/4.

The following describes an exemplary display device (also referred to as the display device of the present embodiment) including the active retarder of the present embodiment.

Figure 4:
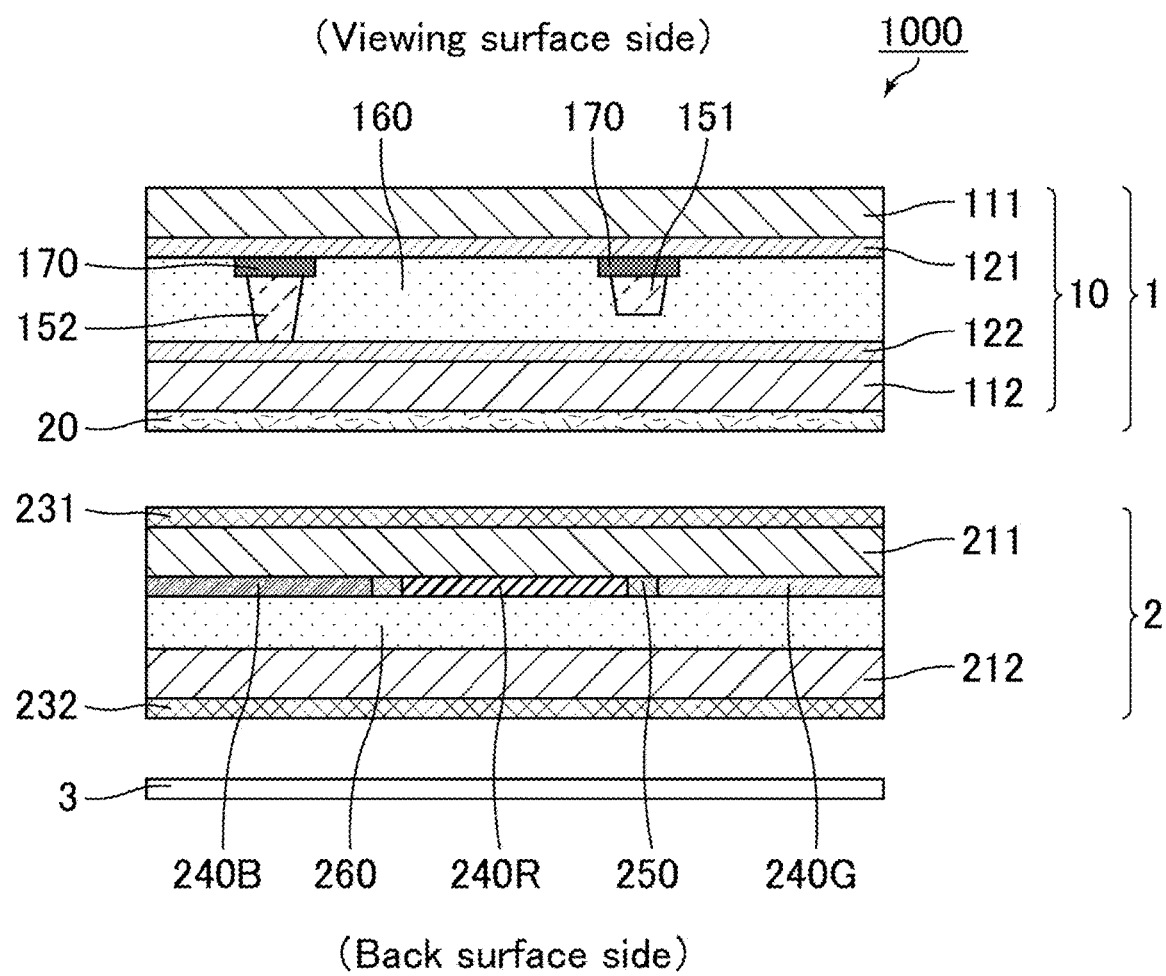
Figure 5:
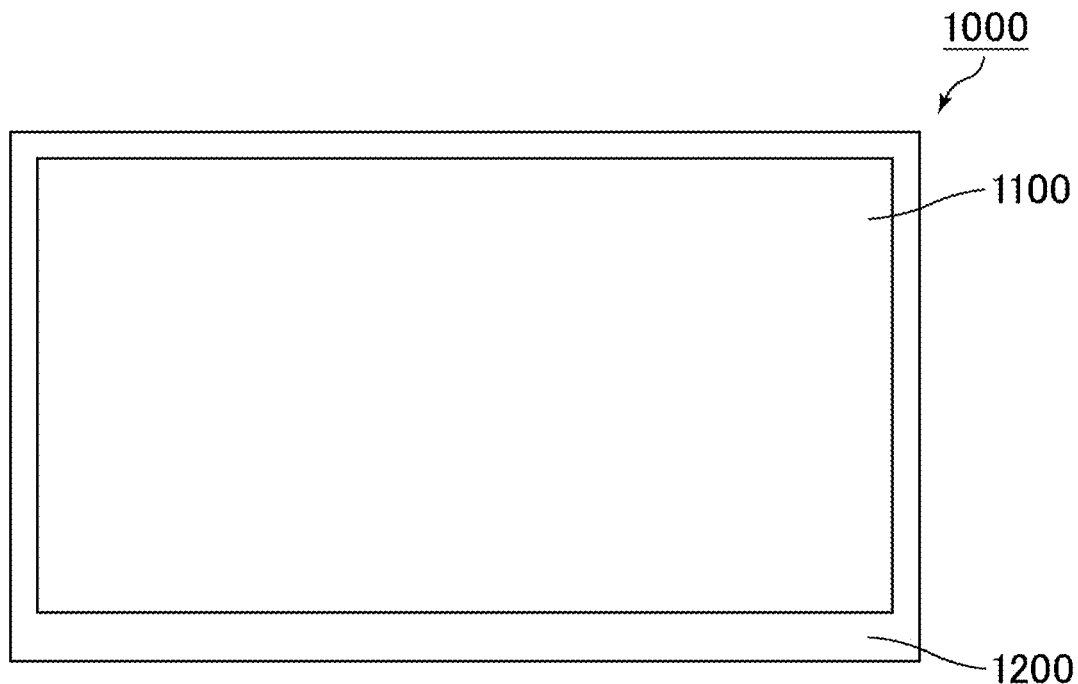
FIG. 5 is a schematic plan view of the display device of Embodiment 1 and the like as seen from the viewing surface side.
Figure 6:
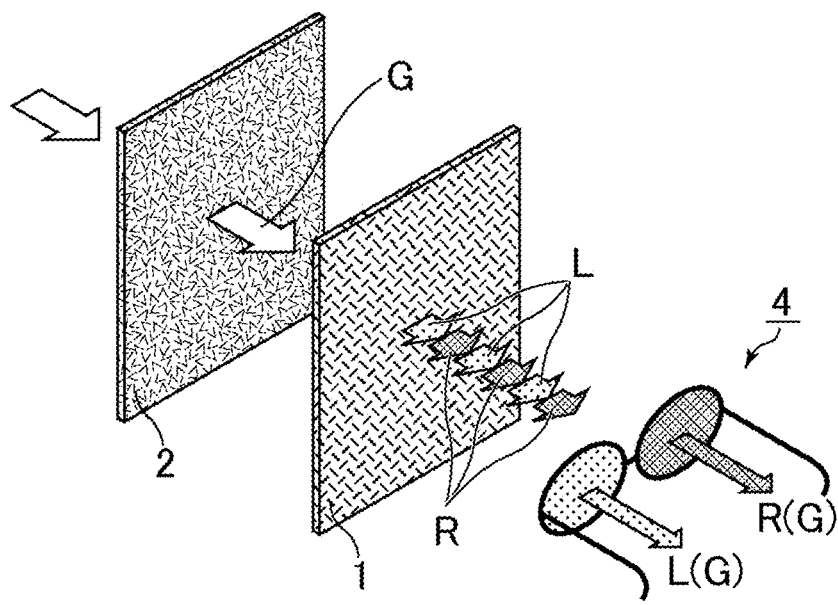
FIG. 6 is a schematic view of a mechanism in which the display device of Embodiment 1 and the like enables observation of images.
Figure 7:
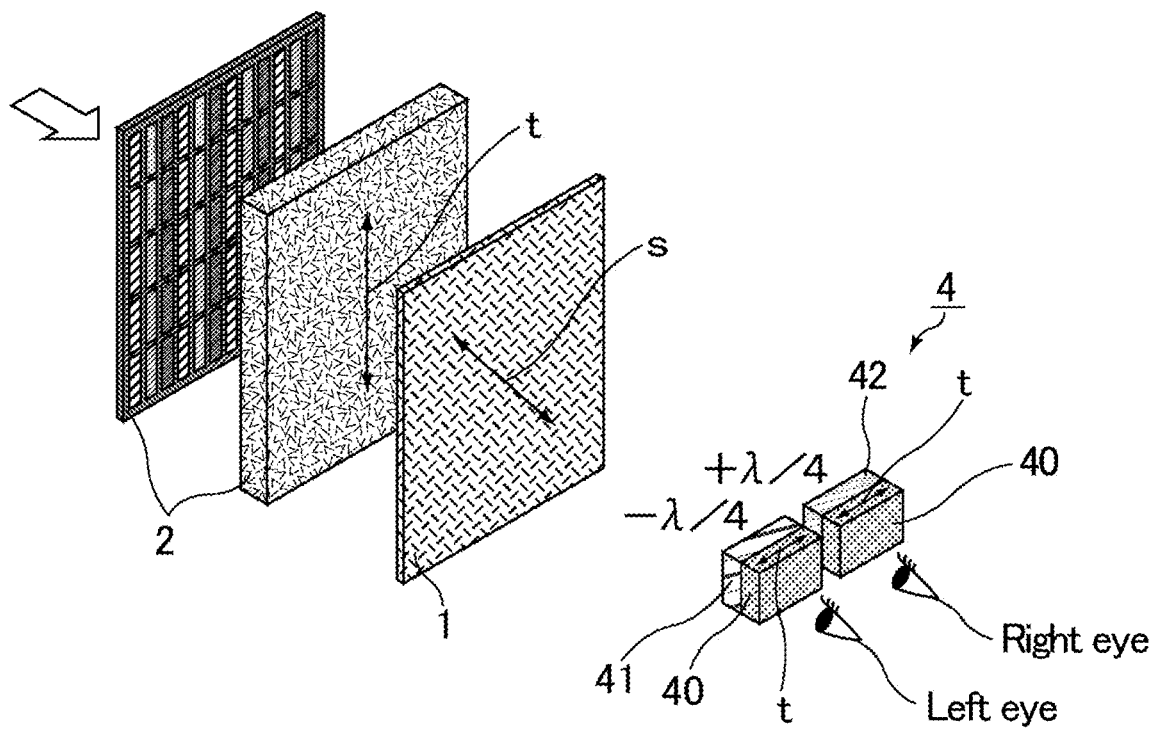
Figure 8:
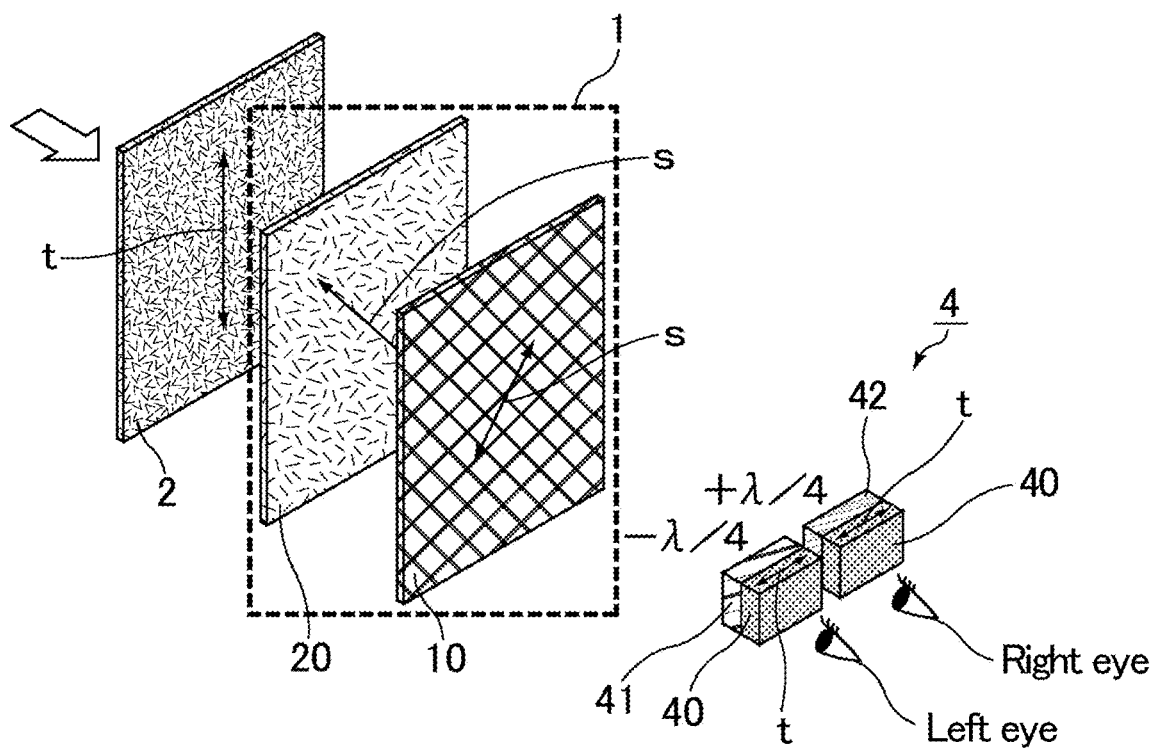

FIG. 4 is a schematic cross-sectional view of a display device of the present embodiment. FIG. 5 is a schematic plan view of the display device of the present embodiment as seen from the viewing surface side. FIG. 6 is a schematic view of a mechanism in which the display device of the present embodiment enables observation of images. FIG. 7 and FIG. 8 are each a schematic view showing optical settings in the display device of the present embodiment.

As shown in FIG. 4, a display device 1000 of the present embodiment includes the active retarder 1 of the present embodiment described above and the image display panel 2. The display device 1000 further includes a backlight 3 on or behind the back surface side of the image display panel 2. The display device 1000 has, as shown in FIG. 5, a display region 1100 and a frame region 1200 surrounding the outer edge of the display region 1100. The display region 1100 is a region that displays desired images, for example. In other words, it is the region viewable from the viewing surface side of the display device 1000 when the light source is turned on. The frame region 1200 is a frame-shaped region surrounding the outer edge of the display region 1100. The frame region 1200 may not transmit light.

The image display panel 2 is an image display panel including pixels. The image display panel 2 sequentially displays images intended for the right eye and images intended for the left eye by time-based switching. As described above, the active retarder 1 changes the polarization state of light between the images intended for the right eye R (G) and the images intended for the left eye L(G) in synchronization with the time-based switching (see FIG. 6).

The viewer sees the images through polarizing glasses 4 from the active retarder 1 side (see FIG. 6 to FIG. 8).

The image display panel 2 is suitably an image display panel including pixels arranged in a matrix pattern. In the present embodiment, a liquid crystal display panel utilizing liquid crystals is used as the image display panel 2.

The liquid crystal display panel 2 may be a liquid crystal panel in which a liquid crystal layer is sandwiched between paired substrates one of which includes pixel electrodes and a common electrode, and voltage is applied between the pixel electrodes and the common electrode to generate a transverse electric field (including a fringe electric field) in the liquid crystal layer. The liquid crystal display panel 2 may also be a liquid crystal panel in which a liquid crystal layer is sandwiched between paired substrates one of which includes pixel electrodes and the other of which includes a common electrode, and voltage is applied between the pixel electrodes and the common electrode to generate a vertical electric field in the liquid crystal layer. Specifically, examples of the transverse electric field mode include the FFS mode and the IPS mode. Examples of the vertical electric field mode include the vertical alignment (VA) mode and the twisted nematic (TN) mode.

The liquid crystal display panel 2 may be in any liquid crystal mode, such as a mode of providing black display by aligning the liquid crystal molecules in a liquid crystal layer 260 vertically to a substrate surface, or a mode of providing black display by aligning the liquid crystal molecules in the liquid crystal layer 260 parallelly to or in a direction that is not vertical or parallel to a substrate surface. The liquid crystal panel 2 may be driven by the TFT method (active matrix method), the simple matrix method (passive matrix method), or the plasma address method.

In the present embodiment, the image display panel (liquid crystal display panel) 2 includes, as shown in FIG. 4, the liquid crystal layer 260 between the paired substrates 211 and 212. One of the substrates (substrate 211 in the present embodiment) includes the pixel electrodes and the common electrode (not shown). The substrate 211 also includes a black matrix layer (BM layer) 250 and color filter layers 240 (blue color filter layer 240B, red color filter layer 240R, and green color filter layer 240G) regularly arranged in the grids of the BM layer.

As described above, the image display panel 2 is suitably one including a BM layer 250 that is formed in a grid pattern in a plan view.

The image display panel 2 can also be a self-luminous display panel. Examples of the self-luminous display panel include organic electroluminescence (EL)-type display panels and micro-LED-type display panels utilizing micrometer (μm) size fine LEDs as RGB elements.

The backlight 3 may be any backlight that emits light. The backlight 3 has, for example, a configuration including a light source and a reflection sheet. The light source can be a common backlight light source, i.e., a light source such as a cold cathode fluorescent lamp (CCFL) or a light emitting diode (LED).

The backlight 3 may also be a direct-lit one or an edge-lit one. Examples of the edge-lit backlight include a backlight 3 having a light source, a reflection sheet, and a light guide plate. The light source is disposed at an end surface of the light guide plate, and the reflection sheet is disposed on the back surface of the light guide plate. The light guide plate may be one usually used in the field of video display devices. Examples of the reflection sheet include aluminum plates, white polyethylene terephthalate (PET) films, reflection films (e.g., enhanced specular reflector (ESR) film available from 3M Company).

The display device 1000 of the present embodiment may include, in addition to the members described above, members such as external circuits, including a tape carrier package (TCP) and a printed circuit board (PCB); optical films, including a viewing angle-increasing film and a luminance-increasing film; and a bezel (frame). Some members may be included in another member. Members other than the members already described above are not limited and may each be one usually used in the field of display devices. Thus, description thereof is omitted.

The polarizing glasses 4 are designed to transmit polarized light from the active retarder 1 for images intended for the right eye through the right eye part and transmit polarized light from the active retarder 1 for images intended for the left eye through the left eye part, so that the viewer can see a 3D image.

The polarizing glasses 4 are linearly polarizing glasses with the polarization axis of the left eye part and the polarization axis of the right eye part being perpendicular to each other in a mode where the active retarder 1 has polarization axes to polarize light for images intended for the left eye and light for images intended for the right eye in directions perpendicular to each other. The polarizing glasses 4 are circularly polarizing glasses with the left eye part and the right eye part transmit opposite-handed circularly polarized lights in a mode where the active retarder 1 transmits opposite-handed circularly polarized lights for images intended for the left eye and images intended for the right eye. In the present embodiment, circularly polarizing glasses are used (see FIG. 7 and FIG. 8).

The polarizing glasses 4 include a $-\lambda/4$ phase difference plate 41 for the left eye part and a $+\lambda/4$ phase difference plate 42 for the right eye part. On the viewer side of the phase difference plates 41 and 42, linearly polarizing plates 40 are disposed whose transmission axis directions t are parallel to the horizontal direction of the polarizing glasses 4 (see FIG. 7 and FIG. 8). As described above, the active retarder 1 of the present embodiment controls application of voltage to the liquid crystal layer 160 in synchronization with the time-based switching by the image display panel 2 so as to switch the phase difference between $+\lambda/4$ and $-\lambda/4$. When the phase difference introduced by the active retarder 1 is $+\lambda/4$, the polarizing glasses 4 introduce a left eye phase difference of $0$ $(=(+\lambda/4)+(-\lambda/4))$ and a right eye phase difference of $+\lambda/2$ $(=(+\lambda/4)+(+\lambda/4))$. In this case, the left eye part does not transmit polarized light while the right eye part transmits polarized light. When the phase difference introduced by the active retarder 1 is $-\lambda/4$, the polarizing glasses 4 introduce a left eye phase difference of $-\lambda/2$ $(=(-\lambda/4)+(-\lambda/4))$ and a right eye phase difference of $0$ $(=(+\lambda/4)+(-\lambda/4))$. In this case, the left eye part transmits polarized light while the right eye part does not transmit polarized light. In particular, in the present invention, suitably, either images intended for the right eye or images intended for the left eye are displayed in the normally white mode, and the other images are displayed in the normally black mode.

Modified Example 1 of Embodiment 1

Figure 9:
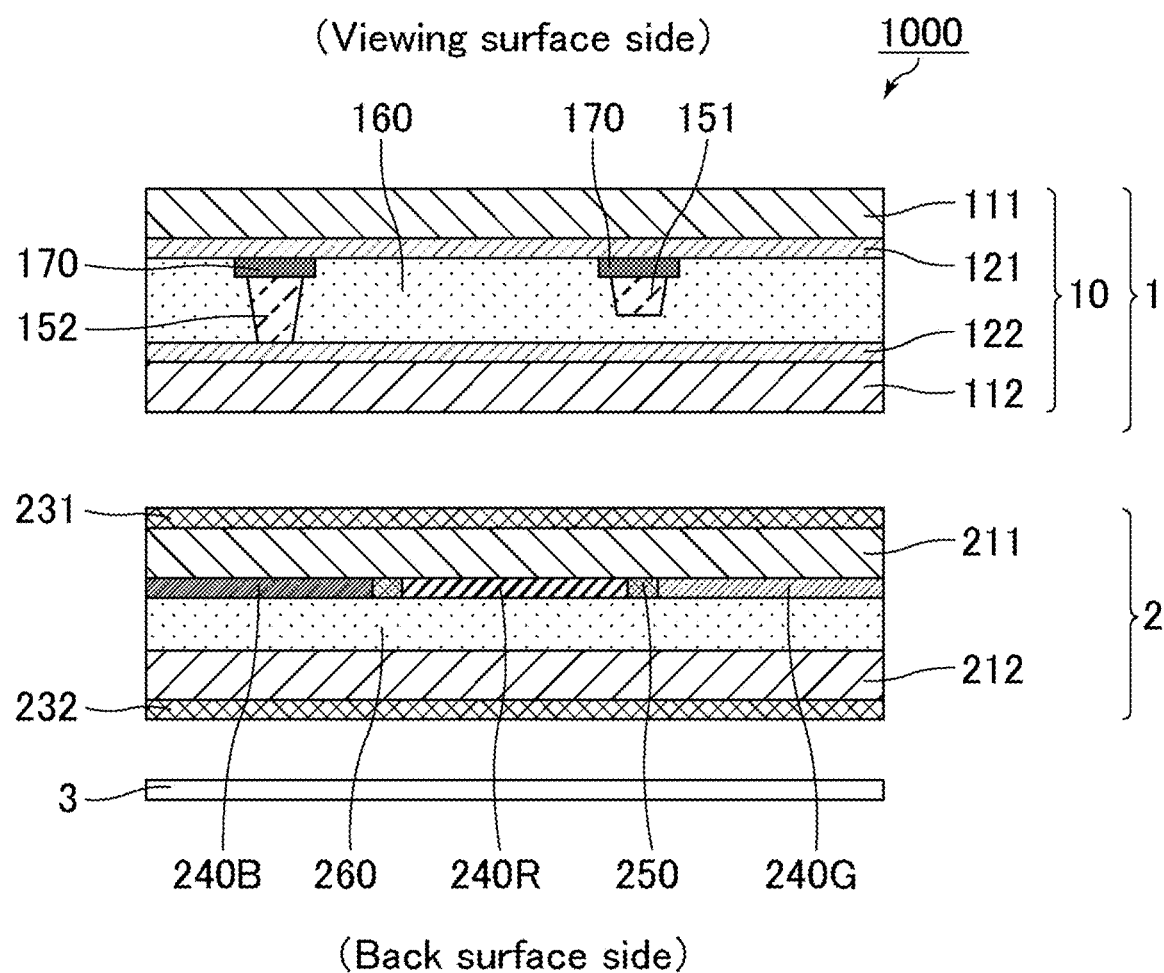
FIG. 9 is a schematic cross-sectional view of a display device of Modified Example 1 of Embodiment 1.

Although Embodiment 1 is directed to a case where the active retarder 1 includes the optical laminate 10 and the phase difference plate 20, at least one of the substrates 111 and 112 in the optical laminate 10 may also serve as a phase difference plate. In other words, an active retarder 1 of the present modified example consists of an optical laminate 10 (see FIG. 9). Suitably, one of the substrates 111 and 112, whichever is closer to the image display panel 2 (substrate 112 in FIG. 9), serves as a phase difference plate. FIG. 9 is a schematic cross-sectional view of a display device of the present modified example.

Modified Example 2 of Embodiment 1

Although Embodiment 1 is directed to a case where the active retarder 1 is driven in the vertical electric field-type ECB mode, the active retarder 1 may be driven in a vertical electric field-type TN mode or OCB mode, or a VA mode.

Embodiment 2

The features unique to the present embodiment are mainly described in the present embodiment, and description of the same features as in Embodiment 1 is omitted. The present embodiment is substantially the same as Embodiment 1, except that the methods of forming first spacers 151 and second spacers 152 are different.

Figure 10:
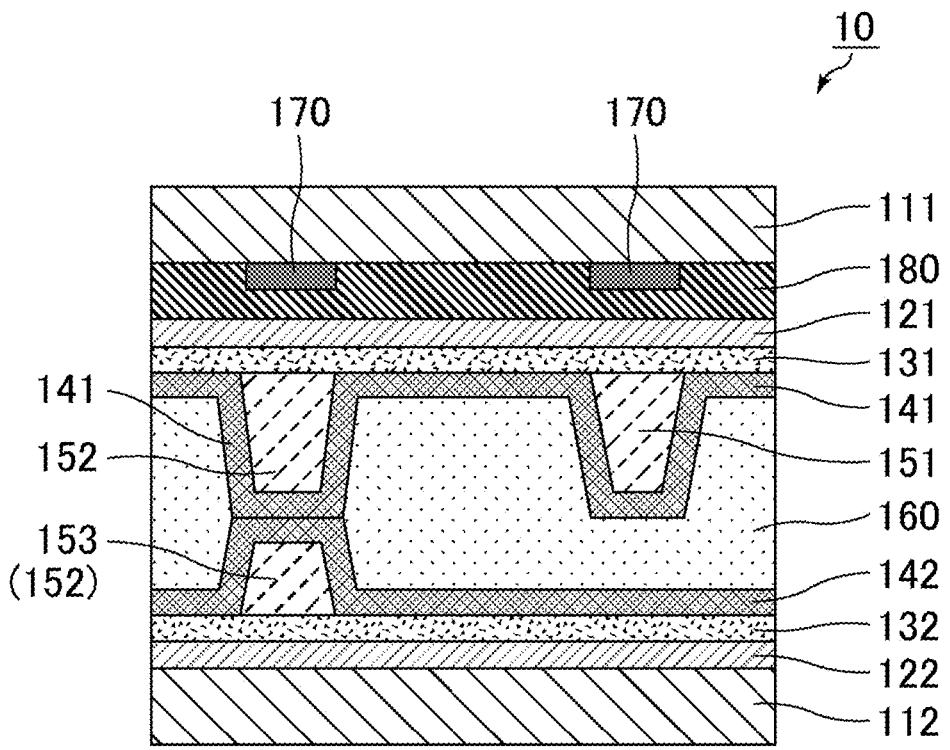
FIG. 10 is a schematic cross-sectional view of an optical laminate in an active retarder for 3D image display of Embodiment 2.

In the present embodiment, columnar spacers all being the same height are formed on the side of one of the substrates (first substrate 111 side in the present embodiment), and bases 153 facing some of these columnar spacers are formed on the second substrate 112 side. These substrates are then attached to each other with a liquid crystal material sandwiched in between, so that columnar spacers combined with no base 153 define first spacers 151 and columnar spacers combined with the bases 153 define second spacers 152 (see FIG. 10). FIG. 10 is a schematic cross-sectional view of the optical laminate in the active retarder of the present embodiment.

The present embodiment eliminates the need for forming multiple types of columnar spacers on the side of one of the substrates as described in Embodiment 1, thus simplifying the steps for the substrate.

Typically, since an active retarder requires switching following ultrafast image switching, the thickness (cell thickness) of the liquid crystal layer tends to be small. Thus, the cell thickness including variations in manufacturing is difficult to control in the current state. However, in the present embodiment, the height of columnar spacers to be formed on the one substrate side and the height of bases to be formed on the other substrate side are measured in advance, so that a combination that should result in the optimal cell thickness can be selected before attachment of the substrates. The present embodiment is therefore advantageous also in terms of cell thickness control.

Embodiment 3

The features unique to the present embodiment are mainly described in the present embodiment, and description of the same features as in Embodiment 1 is omitted. The present embodiment is substantially the same as Embodiment 1, except that the light-blocking components each shielding the corresponding columnar spacer 150 from light limitedly is different.

Figure 11:
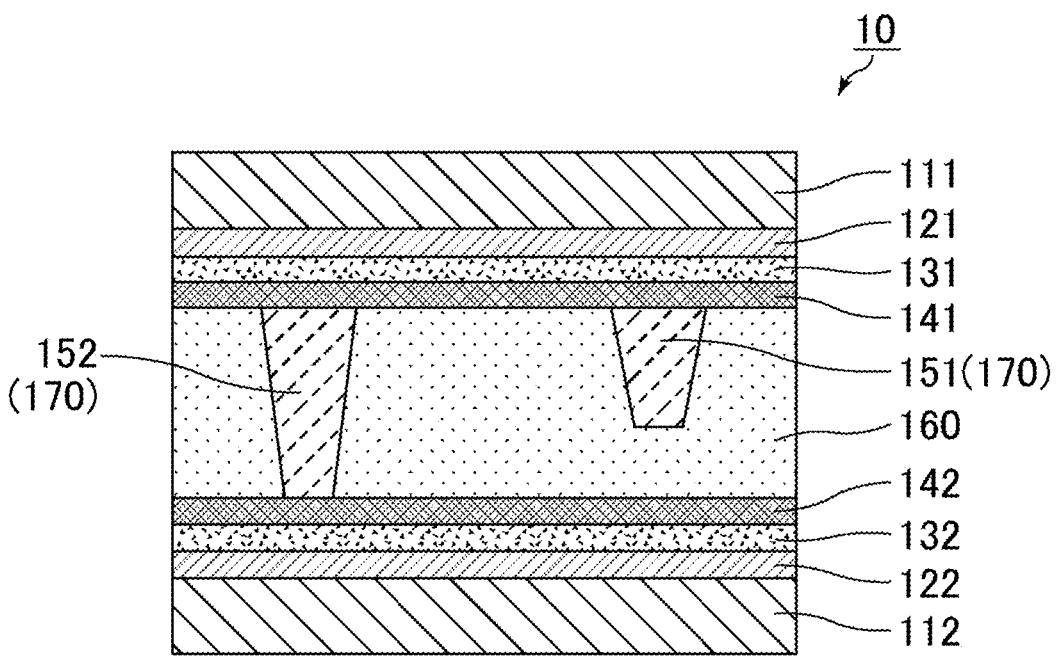
FIG. 11 is a schematic cross-sectional view of an optical laminate in an active retarder for 3D image display of Embodiment 3.

FIG. 11 is a schematic cross-sectional view of an optical laminate in an active retarder of the present embodiment. As shown in FIG. 11, an optical laminate 10 includes a pair of substrates 111 and 112, a pair of electrodes 121 and 122, a liquid crystal layer 160, and columnar spacers 150 (151, 152). Specifically, the optical laminate 10 includes, from the viewing surface side, a first substrate 111, a first electrode 121, a liquid crystal layer 160, a second electrode 122, and a second substrate 112. An insulating film 131 and an alignment film 141 are disposed between the electrode 121 and the liquid crystal layer 160 from the electrode 121 side. An insulating film 132 and an alignment film 142 are disposed between the electrode 122 and the liquid crystal layer 160 from the electrode 122 side.

In the present embodiment, the columnar spacers 150 (first spacers 151 and second spacers 152 in the present embodiment) are each formed using a light blocker and serve as the light-blocking components each shielding the corresponding columnar spacer 150 from light limitedly. In other words, the columnar spacers 150 themselves are light-blocking parts. With such light-blocking components, too, deterioration of 3D display performance (occurrence of crosstalk) due to a shift in phase difference in the vicinity of the columnar spacers 150 can be sufficiently reduced. The present embodiment also enables omission of the planarization film 180 and the light-blocking layer 170 which are used in Embodiment 1, thus enabling simplification of the production process.

The columnar spacers 150 which are light blockers may be formed from any material such as a metal BM or a resin BM described above. The light transmittance of the light blockers is preferably, for example, from 0 to 1%.

Embodiment 4

The features unique to the present embodiment are mainly described in the present embodiment, and description of the same features as in Embodiment 3 is omitted. The present embodiment is substantially the same as Embodiment 3, except that the method for forming columnar spacers 150 (151, 152) is different.

Figure 12:
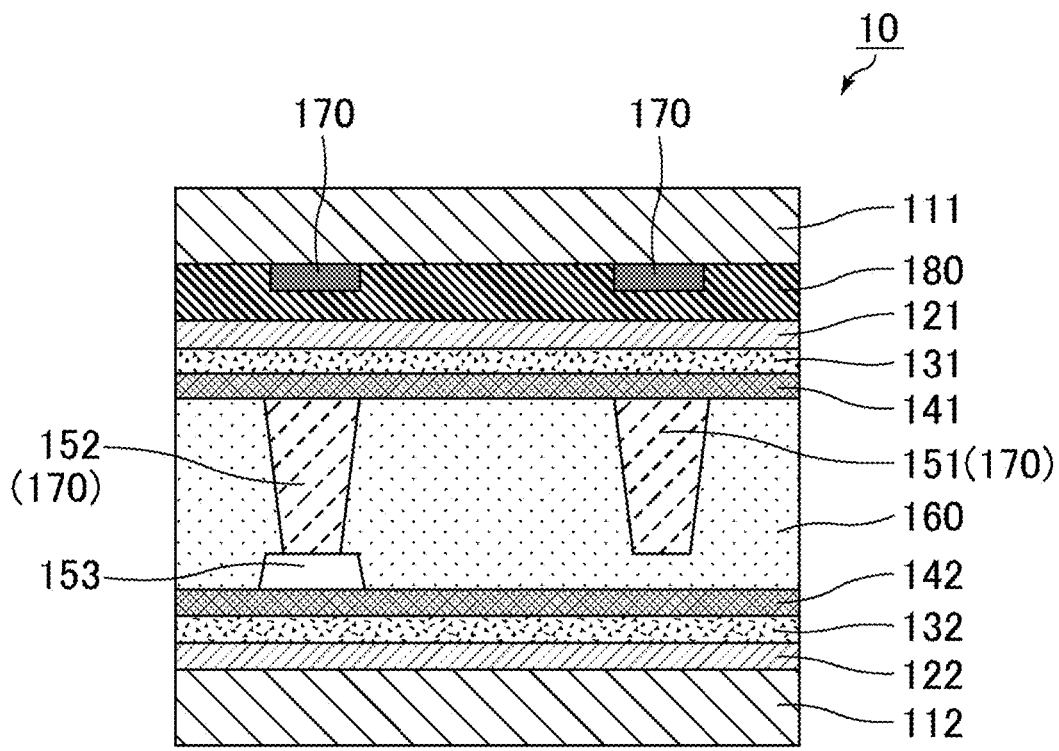
FIG. 12 is a schematic cross-sectional view of an optical laminate in an active retarder for 3D image display of Embodiment 4.

In the present embodiment, columnar spacers all being the same height are formed on the side of one of the substrates (first substrate 111 side in the present embodiment), and bases 153 facing some of these columnar spacers are formed on the second substrate 112 side. These substrates are then attached to each other with a liquid crystal material sandwiched in between, so that columnar spacers combined with no base 153 define first spacers 151 and columnar spacers combined with the bases 153 define second spacers 152 (see FIG. 12). FIG. 12 is a schematic cross-sectional view of the optical laminate in the active retarder of the present embodiment.

In the present embodiment, the bases 153 are formed from a material (e.g., resin material transparent to light) of common columnar spacers. The bases 153 may be light blockers.

Embodiment 5

The features unique to the present embodiment are mainly described in the present embodiment, and description of the same features as in Embodiment 1 is omitted. The present embodiment is substantially the same as Embodiment 1, except that arrangement of columnar spacers 150 is different.

Figure 13:
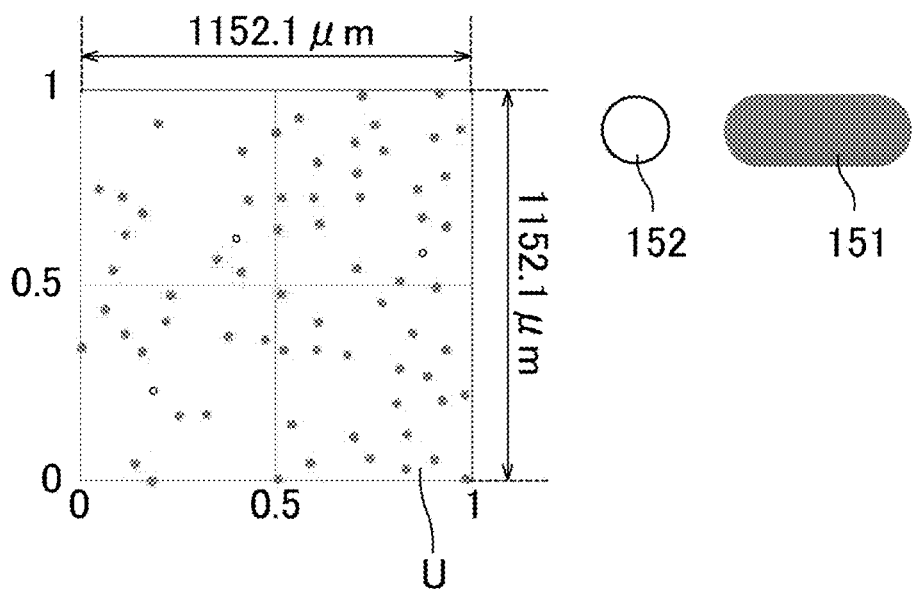
FIG. 13 is a schematic plan view showing arrangement of columnar spacers in Embodiment 5.
Figure 14:
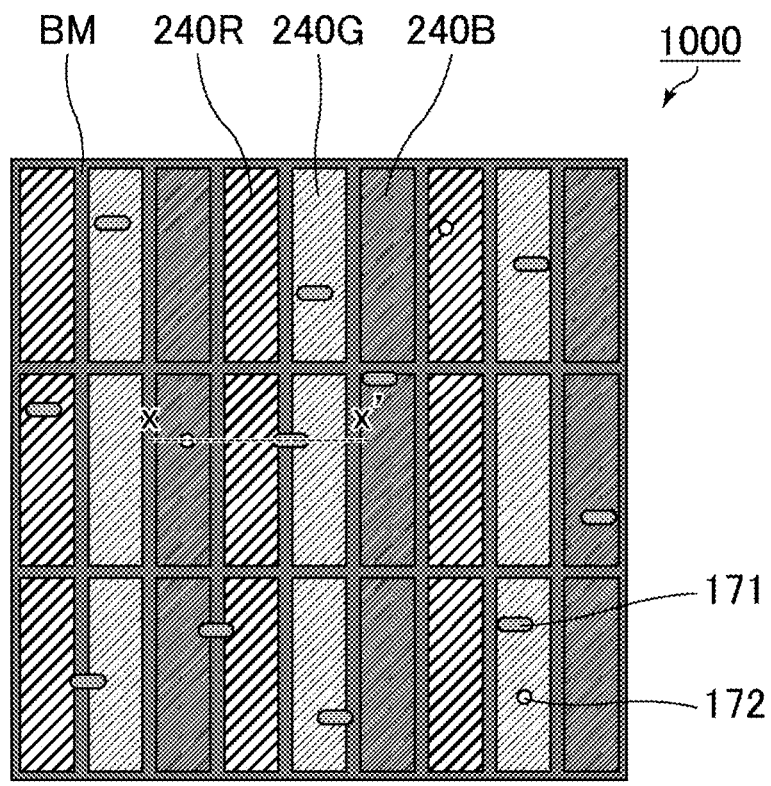
FIG. 14 is a schematic plan view of a display device of Embodiment 5 and the like as seen from the viewing surface side.

FIG. 13 is a schematic plan view showing arrangement of columnar spacers 150 in the present embodiment. FIG. 14 is a schematic plan view of a display device of the present embodiment (and the later-described Modified Examples 1 and 2 of the present embodiment) as seen from the viewing surface side.

An image display panel 2 to be combined with an active retarder 1 is responsible for the basic display performance of a display device. Thus, suitably, the image display panel 2 includes a black matrix (BM) layer for prevention of a decrease in contrast ratio and mixing of colors, and the BM layer is disposed in a grid pattern in a plan view. Meanwhile, in a case where a light-blocking layer 170 is formed from a material such as BM in a grid pattern in the active retarder 1 as with the BM layer of the image display panel 2 and is overlaid with the image display panel 2, there is a concern that the active retarder 1 and the image display panel 2 interfere with each other to cause moire due to the regular arrangement of the BM layer of the image display panel 2 and that of the light-blocking layer 170 of the active retarder 1. In consideration of the influence of parallax, loss of transmittance is also a concern. The active retarder 1, however, collectively controls the polarization state of light emitted from the image display panel 2 in a wide range in the plane of the substrate. Thus, in the active retarder 1, seemingly, the light-blocking layer 170 is not necessarily formed in a regular pattern such as a grid pattern. The present invention thus preferably employs a light-blocking layer 170 formed in a dot pattern in the active retarder 1. Similarly, the columnar spacers 150 are suitably arranged in a dot pattern. In particular, the columnar spacers 150 are suitably arranged randomly as described later. For reduction or prevention of moire, the columnar spacers 150 and the light-blocking layer 170 are suitably arranged in a non-grid pattern or a non-linear pattern.

In the present embodiment, as shown in FIG. 13, the unit of a 1152.1 μm×1152.1 μm square in a plan view of the liquid crystal layer 160 is taken as a base unit (also referred to as repeating unit) U, and the base unit U is repeated in the entire area of the liquid crystal layer 160. In the base unit U, there are three second spacers 152 each having a diameter φ of about 15.3 μm and a height of 1.6 μm, and many first spacers 151 each having a minor axis of about 15 μm, a major axis of 40 μm, a height of 1.3 μm, and corners whose shapes are quadrant. The arrangement is significantly random as compared to that in Embodiment 1. The present embodiment enables even better reduction or prevention of occurrence of moire. In particular, it is preferred that, in a plan view, unit regions with the same arrangement pattern of the columnar spacers are disposed with constant repeating pitches and the columnar spacers are disposed randomly within one of the unit regions.

Figure 15:
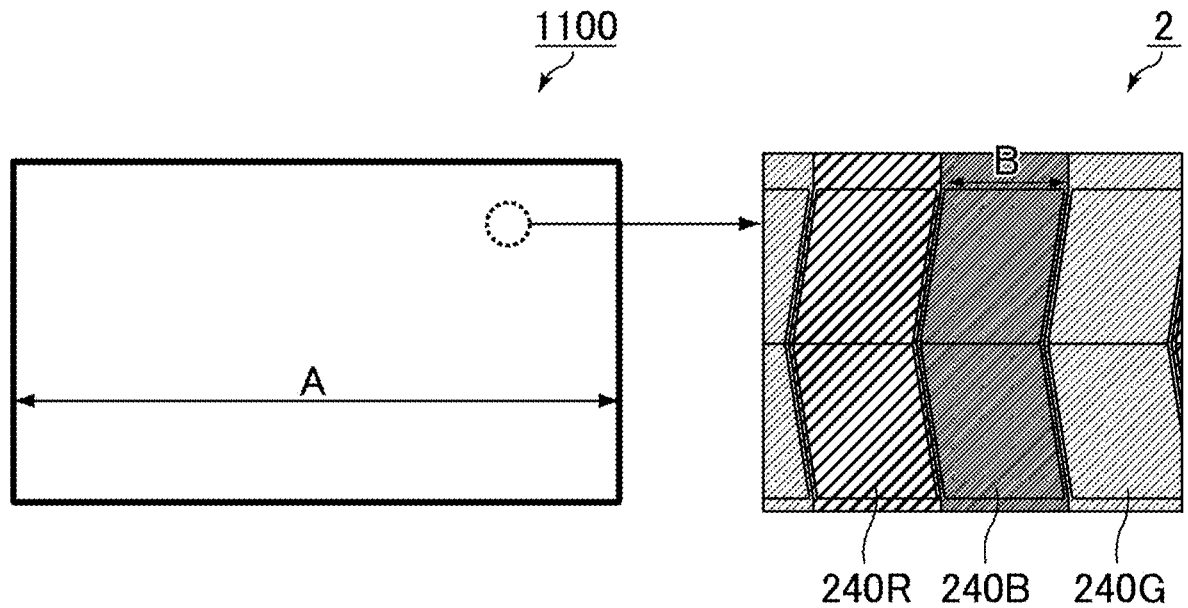
FIG. 15 is a schematic plan view showing a pitch B that is included in pixel pitches of an image display panel 2 and parallel to a long side A of a display region 1100 of a display device.

In a case where the length of the pitch B included in the pixel pitches of the image display panel 2 and parallel to the long side A of the display region 1100 of the display device is 77.7 μm, in Embodiment 1, the length of the repeating pitches (932.4 μm) of the columnar spacers 150 is an integer multiple of the length of the pitch B. In the present embodiment, however, the length of the repeating pitches (1152.1 μm) of the columnar spacers 150 is not an integer multiple of the length of the pitch B. This means that in the present embodiment, the repeating pitches of the columnar spacers and the pixel pitches do not match within the screen. This further destroys the regular relationship between them to further prevent interference with each other, thus further reducing or preventing occurrence of moire. FIG. 15 is a schematic plan view showing a pitch B included in the pixel pitches of the image display panel 2 and parallel to the long side A of the display region 1100 of the display device.

When the length of the long side A (see FIG. 15) of the display region 1100 of the display device is 59.6736 cm, the length is an integer multiple of the repeating pitch (932.4 μm) of the columnar spacers 150 in Embodiment 1. In the present embodiment, the length of the repeating pitches (1152.1 μm) of the columnar spacers 150 is not an integer multiple of the length of the long side A. This structure also further destroys the regular relationship between them to further prevent interference with each other, thus further reducing or preventing occurrence of moire.

Modified Example 1 and Modified Example 2 of Embodiment 5

Figure 16:
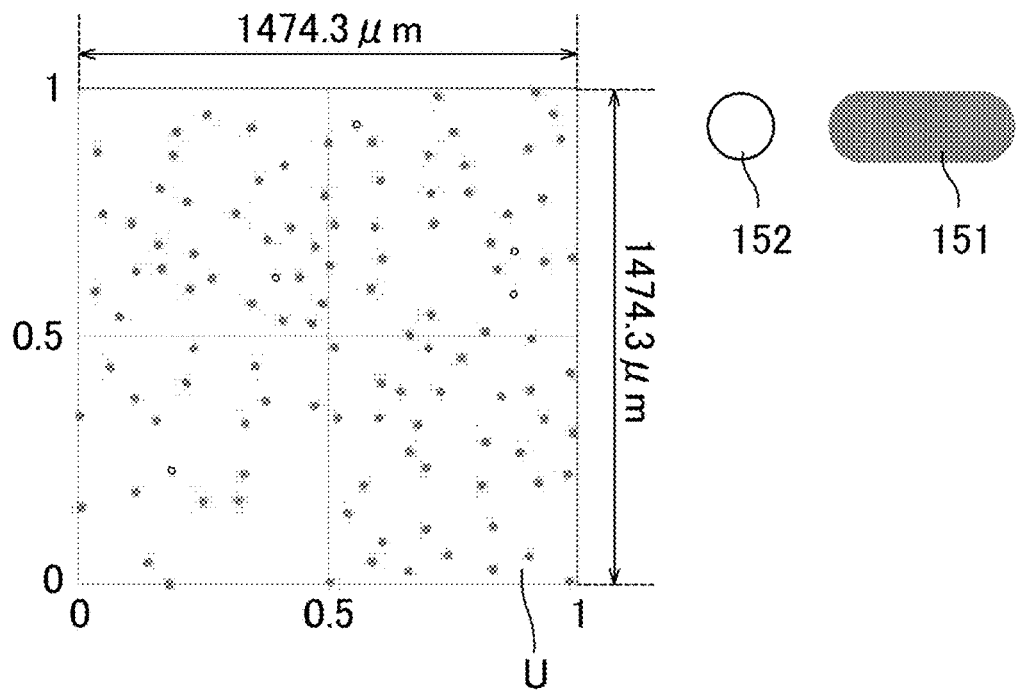
FIG. 16 is a schematic plan view showing arrangement of columnar spacers in Modified Example 1 of Embodiment 5.
Figure 17:
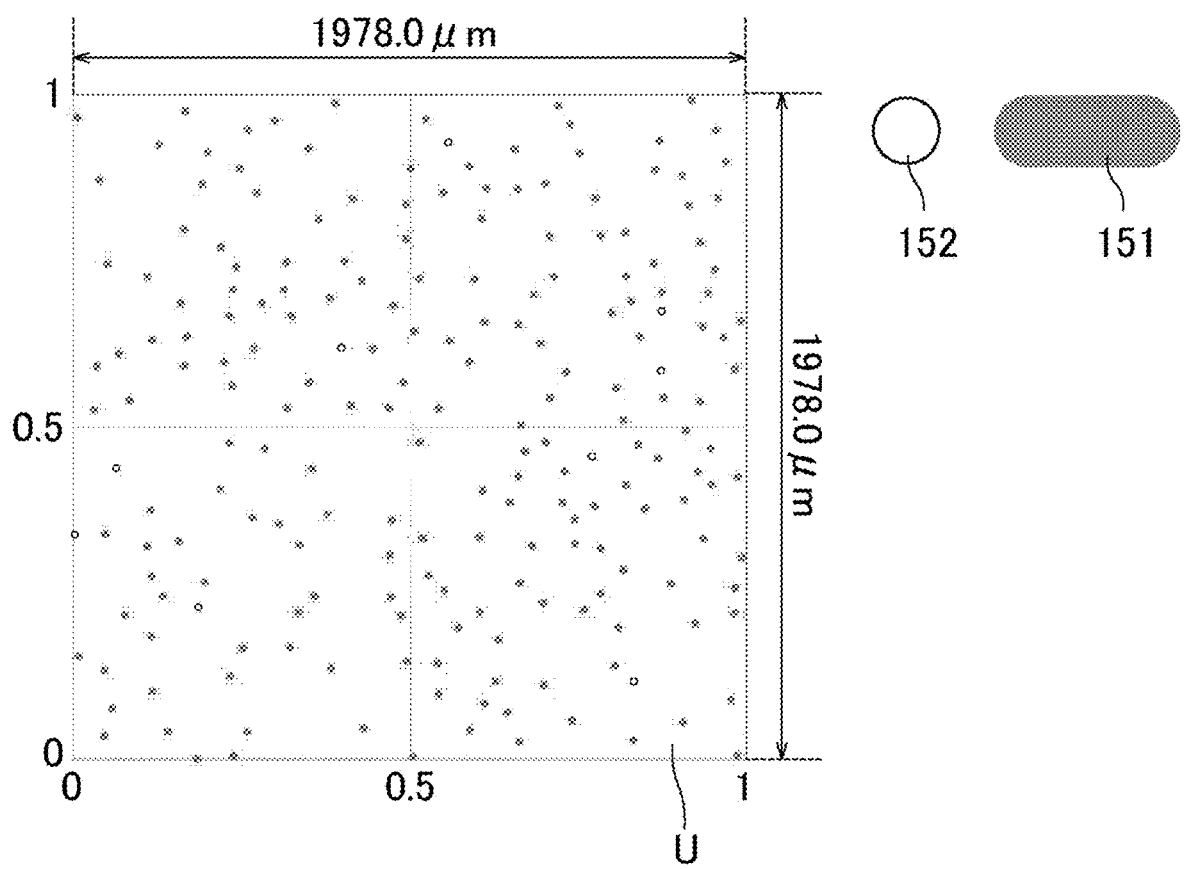
FIG. 17 is a schematic plan view showing arrangement of columnar spacers in Modified Example 2 of Embodiment 5.

Although Embodiment 5 is directed to a case where the unit of a 1152.1 μm×1152.1 μm square in a plan view of a liquid crystal layer 160 is taken as a repeating unit U, the length of the repeating pitches may be further changed within the range where it is not an integer multiple of the length of the pitch B. In Modified Example 1, the unit of a 1474.3 μm×1474.3 μm square in a plan view of a liquid crystal layer 160 is taken as a repeating unit U (see FIG. 16). In Modified Example 2, the unit of a 1978.0 μm×1978.0 μm square in a plan view of the liquid crystal layer 160 is taken as a repeating unit U (see FIG. 17). In the present Modified Examples 1 and 2, the moire pattern is further segmentalized to be even less noticeable than in Embodiment 5. FIG. 16 is a schematic plan view showing arrangement of columnar spacers 150 in the present Modified Example 1. FIG. 17 is a schematic plan view showing arrangement of columnar spacers 150 in the present Modified Example 2.

Thus, in the present invention, from the viewpoint of more sufficient reduction or prevention of moire, the length of a pitch C included in the repeating pitches of the columnar spacers 150 and parallel to a long side A of a display region 1100 of the display device is suitably not an integer multiple of a length of the pitch B (i.e., pitch included in the pixel pitches of an image display panel 2 and parallel to the long side A of the display region 1100 of the display device). In particular, the length of the pitch C is more preferably 10 to 30 times the length of the pitch B and is not an integer multiple of the length of the pitch B, still more preferably 15 to 30 times the length of the pitch B and is not an integer multiple of the length of the pitch B.

From the same viewpoint, suitably, the length of the long side A of the display region 1100 of the display device is not an integer multiple of the length of the pitch C (i.e., pitch included in the repeating pitches of the columnar spacers 150 and parallel to the long side A). In particular, the length of the long side A is more preferably 20 to 60 times the length of the pitch C and not an integer multiple of the length of the pitch C, still more preferably 30 to 45 times the length of the pitch B and is not an integer multiple of the length of the pitch B.

Embodiment 6

The features unique to the present embodiment are mainly described in the present embodiment, and description of the same features as in Embodiment 1 is omitted. The present embodiment is substantially the same as Embodiment 1, except for including a light diffusing adhesive layer 5 between an active retarder 1 and an image display panel 2.

A display device 1000 of the present embodiment includes, as shown in FIG. 18, the light diffusing adhesive layer 5 between the active retarder 1 and the image display panel 2. This enables sufficient reduction or prevention of occurrence of moire. FIG. 18 is a schematic cross-sectional view of an active retarder of the present embodiment.

The light diffusing adhesive layer 5 can be, for example, a light scattering film. A light scattering film is, for example, a film that includes a support and adhesive layers formed on the respective surfaces of the support, with fine particles mixed in the adhesive layer formed on at least one of the surfaces of the support. The light diffusing adhesive layer 5 may also be, for example, a lens such as a lenticular lens.

The thickness of the light diffusing adhesive layer 5 is not limited and is preferably, for example, 5 μm or greater and 200 μm or smaller, more preferably 10 μm or greater and 100 μm or smaller. The light diffusing adhesive layer 5 may have a single-layer structure or a laminate structure including two or more layers.

Embodiment 7

The features unique to the present embodiment are mainly described in the present embodiment, and description of the same features as in Embodiment 1 is omitted. The present embodiment is substantially the same as Embodiment 1, except for including only second spacers 152 as columnar spacers 150.

FIG. 19 is a schematic cross-sectional view of an optical laminate 10 in an active retarder of the present embodiment. As shown in FIG. 19, the optical laminate 10 includes a pair of substrates 111 and 112, a pair of electrodes 121 and 122, a liquid crystal layer 160, and columnar spacers 150 (152). Specifically, the optical laminate 10 includes, from the viewing surface side, a first substrate 111, a first electrode 121, a liquid crystal layer 160, a second electrode 122, and a second substrate 112. A light-blocking layer 170 that shields each of the columnar spacers 150 (152) from light limitedly is disposed between the first substrate 111 and the first electrode 121, and a planarization film 180 is disposed between the light-blocking layer 170 and the first electrode 121. An insulating film 131 and an alignment film 141 are disposed between the electrode 121 and the liquid crystal layer 160 sequentially from the electrode side. An insulating film 132 and an alignment film 142 are disposed between the electrode 122 and the liquid crystal layer 160 sequentially from the electrode side.

In the present embodiment, the optical laminate 10 includes, as the columnar spacers, only the second spacers 152 being the same height as the thickness of the liquid crystal layer 160 and disposed to control the thickness of the liquid crystal layer 160. In other words, the optical laminate 10 includes no first spacers 151 disposed like floating islands. The present embodiment enables simplification of the production process and reduction in density of the columnar spacers. The reduction in density of the columnar spacers can further reduce or prevent occurrence of moire. Thus, the active retarder 1 of the present embodiment can be even more useful for a non-touch panel display device (e.g., display device with no touch panel function).

Embodiment 8

The features unique to the present embodiment are mainly described in the present embodiment, and description of the same features as in Embodiment 1 is omitted. Although Embodiment 1 is directed to a case where the active retarder 1 includes one optical laminate, an active retarder including two or more optical laminates may be used. The present embodiment is directed to a case where a first optical laminate and a second optical laminate are included as optical laminates.

Figure 21:
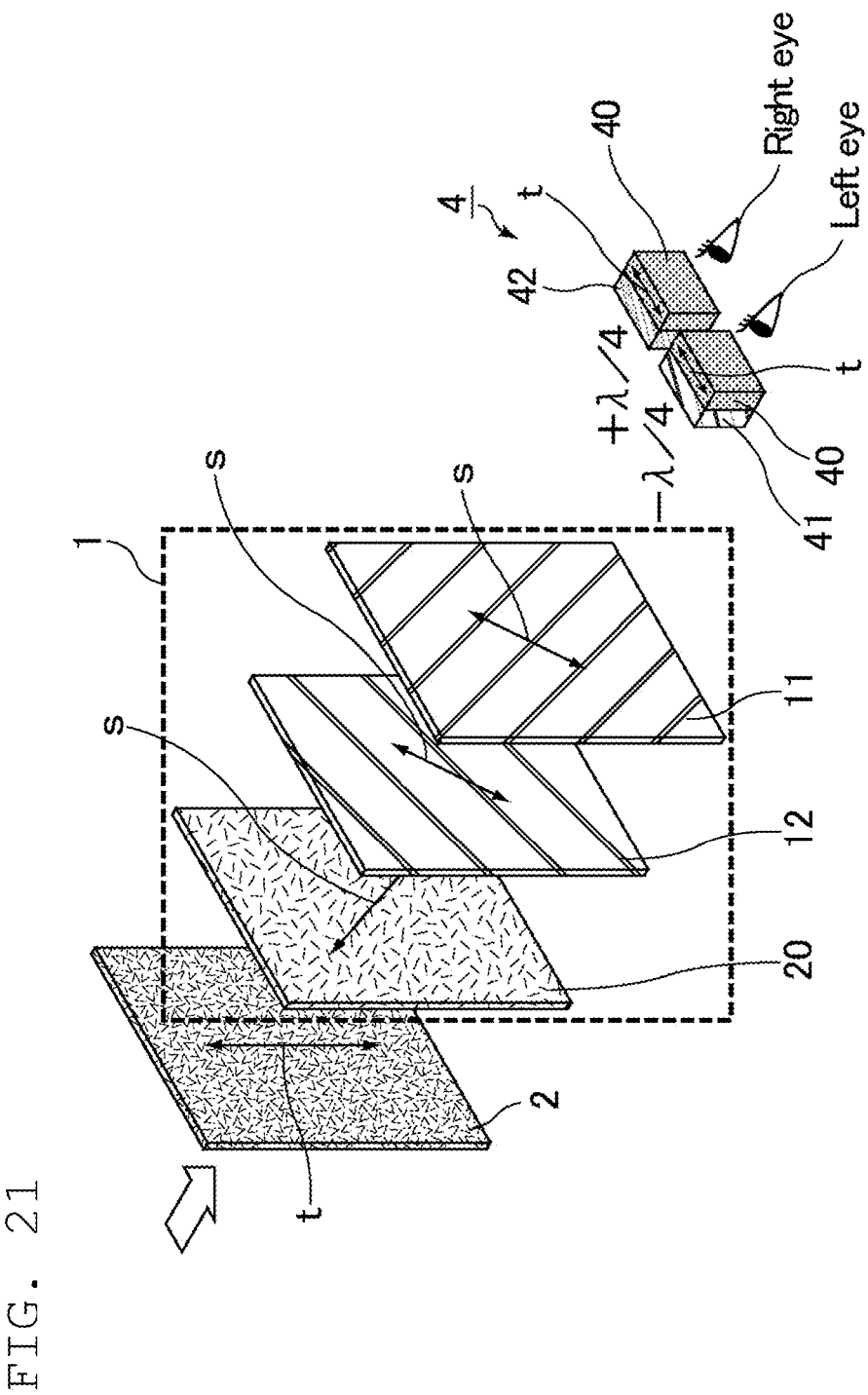
FIG. 21 is a schematic view showing optical settings in a display device of Embodiment 8.

FIG. 20 is a schematic cross-sectional view of an active retarder of the present embodiment. As shown in FIG. 20, an active retarder 1 includes two optical laminates 10 (i.e., first optical laminate 11 and second optical laminate 12) and a phase difference plate 20. FIG. 21 is a schematic view showing optical settings in a display device of the present embodiment.

An image display panel 2 is an image display panel including pixels. The image display panel 2 sequentially displays images intended for the right eye and images intended for the left eye by time-based switching. As described above, the active retarder 1 changes the polarization state of light between the images intended for the right eye R (G) and the images intended for the left eye L (G) in synchronization with the time-based switching (see FIG. 6). The viewer uses polarizing glasses 4 to see the images from the active retarder 1 (see FIG. 6, FIG. 7, and FIG. 21).

In the present embodiment, the first optical laminate 11 and the second optical laminate 12 each switch the phase difference between $\lambda/4$ and 0. In other words, the combination of the optical laminates as a whole switches the phase difference between $\lambda/2$ and 0. A $\lambda/4$ plate is used as the phase difference plate 20, and the slow axis s of the first optical laminate 11 and the slow axis s of the second optical laminate 12 are set parallel to each other and the slow axis s of the first optical laminate 11 or the second optical laminate 12 is set perpendicular to the slow axis s of the phase difference plate 20 (see FIG. 21). This enables the active retarder 1 of the present embodiment to switch the phase difference between $+\lambda/4$ and $-\lambda/4$.

Embodiments of the present invention have been described. Each and every matter described above is applicable to the general aspects of the present invention.

EXAMPLES

The present invention is described in more detail below with reference to examples and comparative examples. The present invention is not limited to the examples.

Example 1

Figure 22:
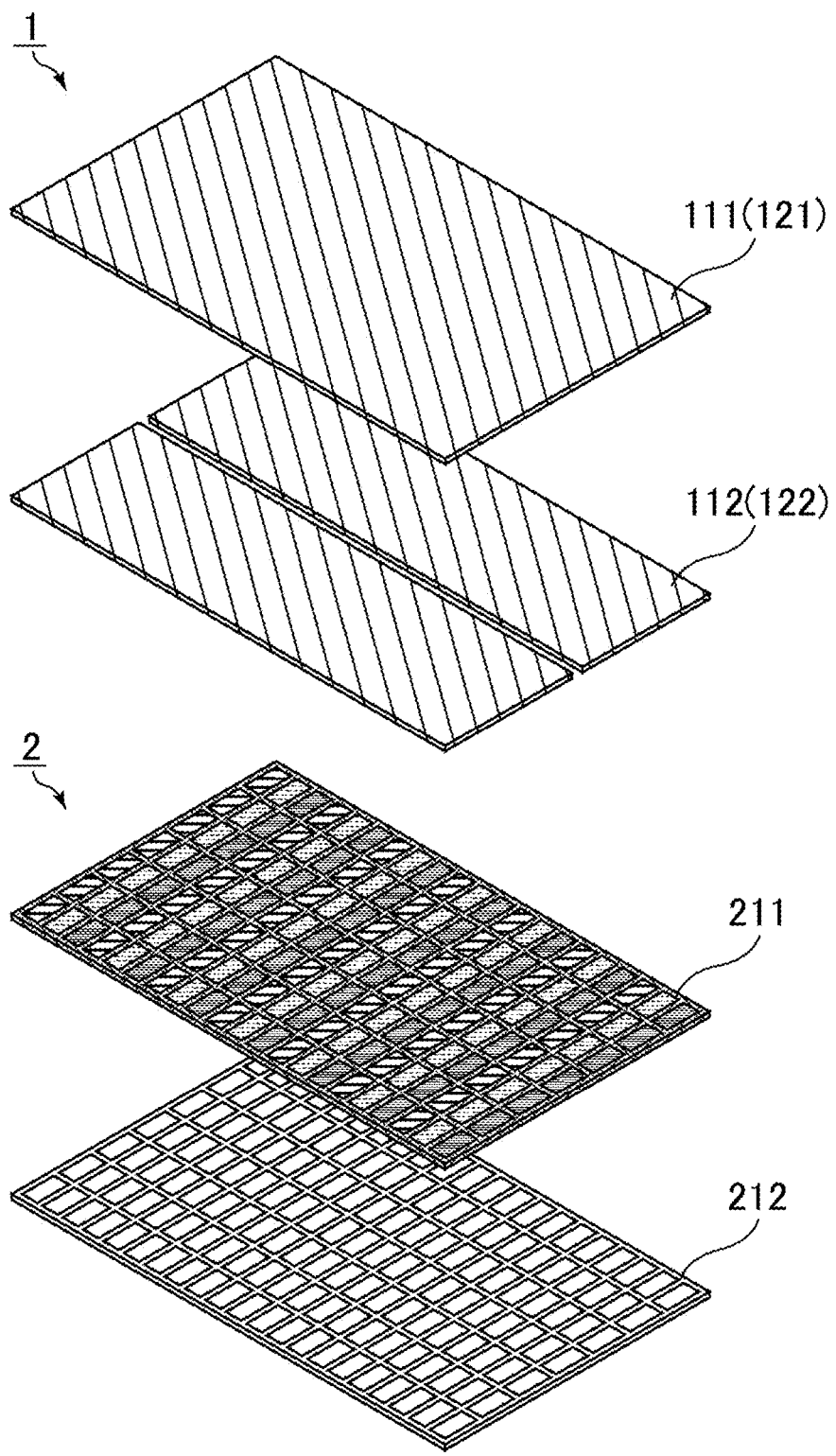
FIG. 22 conceptually shows the structure of a display device of Example 1.

An active retarder and a display device of Example 1 respectively correspond to the active retarder and the display device of Embodiment 1 (see FIG. 1 to FIG. 8). An optical laminate 10 in an active retarder 1 was produced through the following procedure. FIG. 22 conceptually shows the structure of a display device of the present example.

(Production of Upper Substrate)

A light-blocking layer 170, a planarization layer 180, a transparent conductive film 121, an insulating film 131, and columnar spacers 150 (151, 152) were formed on a 0.5-mm-thick glass substrate 111. The light-blocking layer 170 was disposed to overlap the columnar spacers 150. The light-blocking layer 170 was formed using a resin BM and had a thickness of 1.2 μm. The light-blocking layer 170 may also be formed using a non-transparent metal BM. The planarization film 180 was formed using a transparent organic film and had a thickness of 2 μm. The transparent conductive film 121 was formed from IZO and had a thickness of 70 nm. The insulating film 131 was formed from SiN and had a thickness of 80 nm. The columnar spacers 150 were disposed to be hidden by the light-blocking layer 170. The columnar spacers disposed like floating islands serving as the first spacers 151 had a size of 15 μm×40 μm and a height of 1.3 μm, and the rest of the columnar spacers serving as the second spacers 152 had a diameter φ of 15 μm and a height of 1.6 μm. Both spacers were formed using a transparent organic film.

(Production of Lower Substrate)

A transparent conductive film 122 and an insulating film 132 were formed on a 0.5-mm-thick glass substrate 112. The transparent conductive film 122 was formed from IZO and had a thickness of 70 nm. The insulating film 132 was formed from SiN and had a thickness of 80 nm. The screen size was 27 inch, the effective display region was 581.8176 mm in width and 333.7992 mm in length, and the electrode had a two-segment structure in which a transparent electrode film was divided vertically at the center (see FIG. 22).

(Liquid Crystal Layer)

Alignment films (141, 142) were formed on the respective substrates produced as above, and the substrates were attached to each other with a liquid crystal material dropped therebetween. The alignment films 141 and 142 were formed from polyimide for horizontal alignment. The alignment films each had a thickness of 90 nm and the surfaces thereof were subjected to rubbing treatment such that the rubbing directions were anti-parallel. The anisotropy of dielectric constant $\Delta\varepsilon$ of the liquid crystal molecules was 0.16 (positive).

Comparative Example 1

Figure 23:
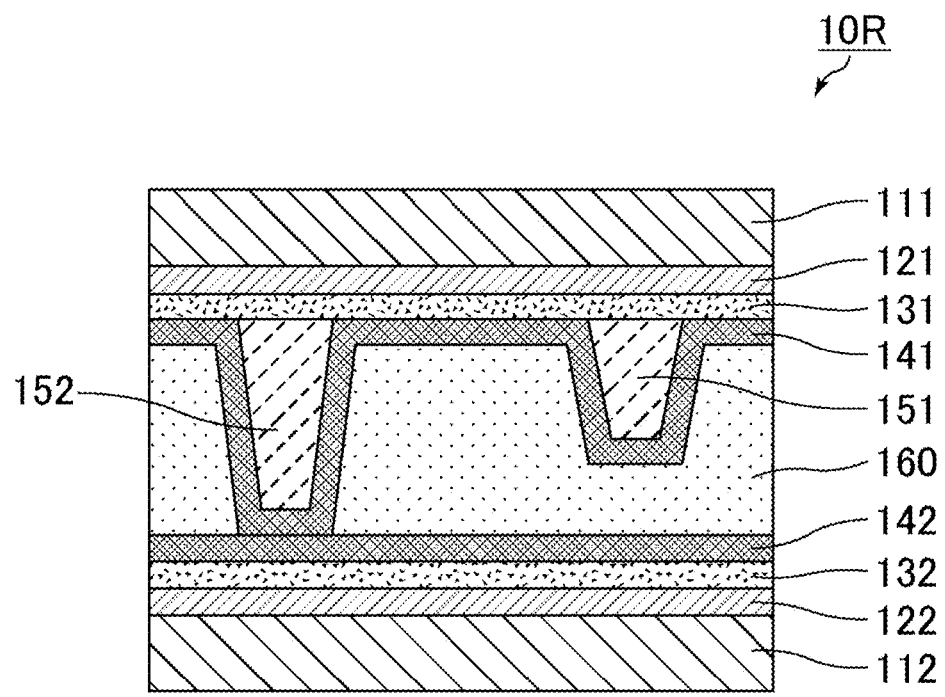
FIG. 23 is a schematic cross-sectional view of an optical laminate in an active retarder for 3D image display of Comparative Example 1.

An optical laminate 10R was produced as in Example 1, except that the light-blocking layer 170 and the planarization layer 180 were removed from the upper substrate, followed by production of an active retarder and a display device. FIG. 23 is a schematic cross-sectional view of an optical laminate 10R in the active retarder of the present comparative example. The optical laminate 10R does not include a light-blocking layer or other light-blocking components, and thus the columnar spacers 150 transmit incident light.

(Evaluation Test 1)

Images intended for the right eye R (G) and images intended for the left eye L (G) sequentially displayed by time-based switching on the image display panel 2 in each of the display devices of Example 1 and Comparative Example 1 were observed through polarizing glasses 4 from the active retarder 1 side (see FIG. 6). The photographs of the images observed by the left eye part and the right eye part of the polarizing glasses 4 are shown in FIG. 24.

Figure 24:
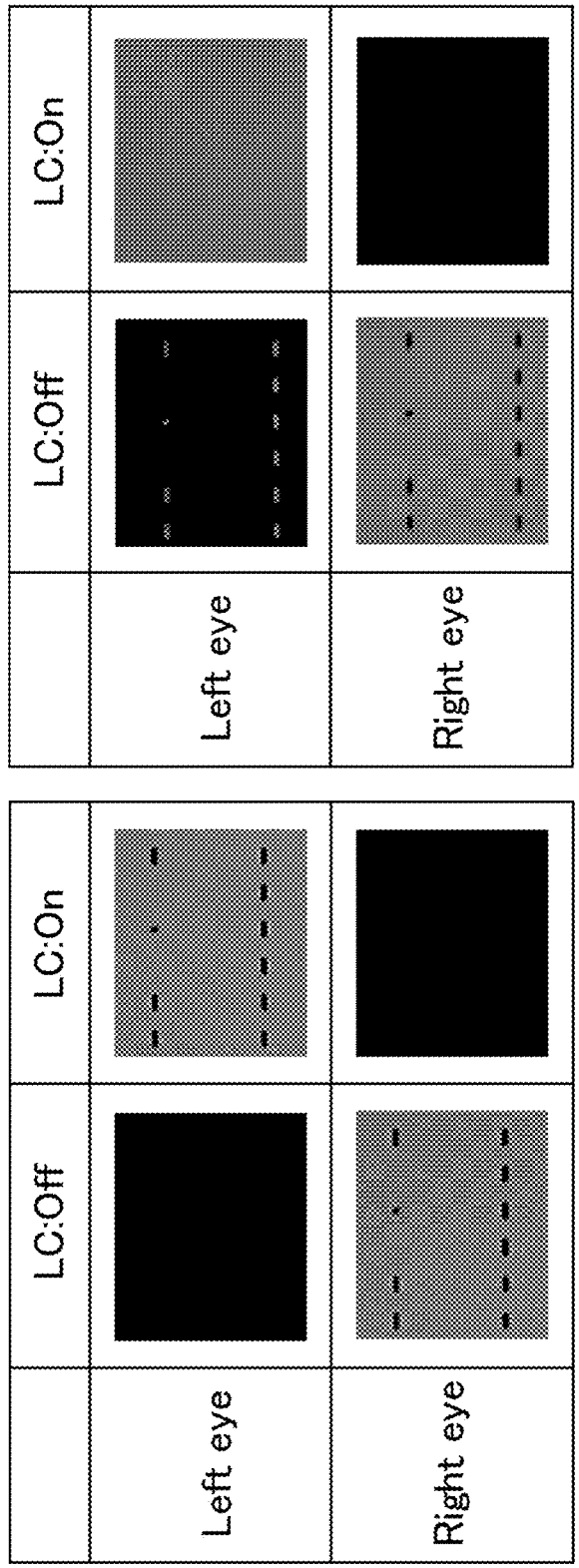
FIG. 24 shows the results of Evaluation Test 1.

In FIG. 24, "LC: Off" means that voltage is not applied to the liquid crystal layer of the active retarder. In this state, the phase difference switched by the active retarder is $+\lambda/4$, and the left eye part of the polarizing glasses 4 does not transmit polarized light (black state) while the right eye part transmits polarized light (white state). "LC: On" means that voltage is applied to the liquid crystal layer of the active retarder. In this state, the phase difference switched by the active retarder is $-\lambda/4$, and the left eye part of the polarizing glasses 4 transmits polarized light (white state) while the right eye part does not transmit polarized light (black state).

As shown in FIG. 24, in Example 1, there is no significant difference in the black state and the white state between the left and right eyes. Also, no light leakage is observed in the black state. Thus, the results suggest that the balance of display quality between the left and right eyes is good and crosstalk is at a low level.

In contrast, in Comparative Example 1, there is a difference in the black state and the white state between the left and right eyes. Light leakage is observed in the black state for the left eye, but no light leakage is observed in the black state for the right eye. Light leakage means increase in crosstalk. Also, there are some dark regions in the white state for the right eye, whereas the screen is entirely bright in the white state for the left eye. The results therefore suggest that there are issues of crosstalk and the balance of display quality between the left and right eyes.

Figure 25:
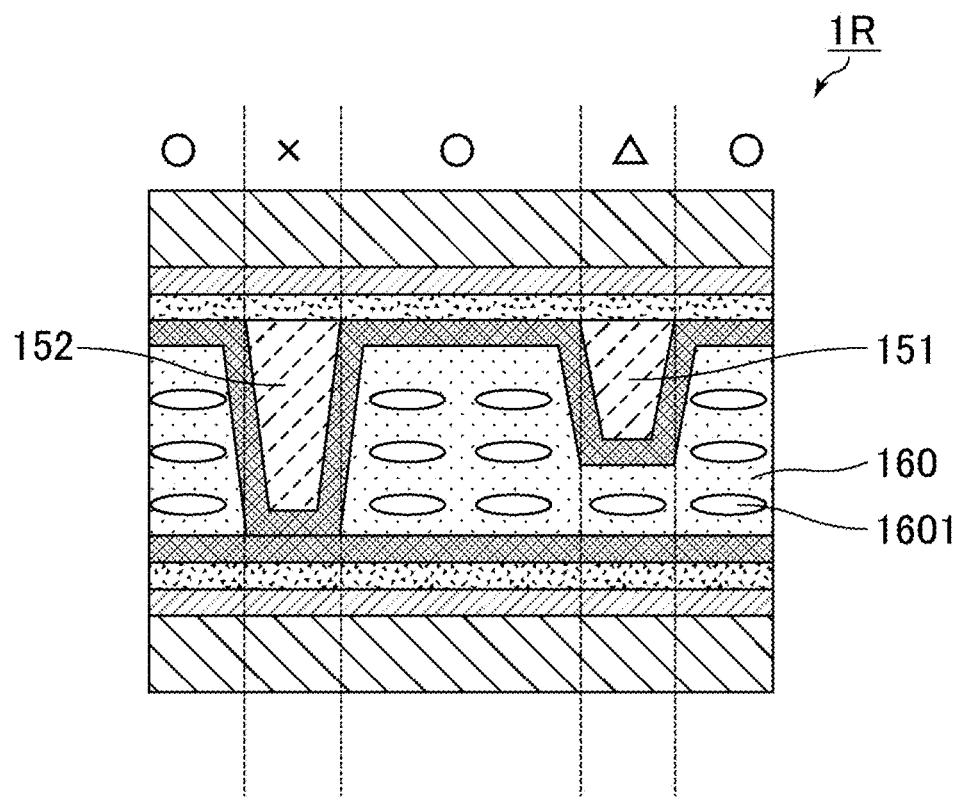
FIG. 25 conceptually shows the alignment (horizontal alignment) of liquid crystal molecules with no voltage applied to a liquid crystal layer in the active retarder for 3D image display of Comparative Example 1.

FIG. 25 conceptually shows the alignment (horizontal alignment) of liquid crystal molecules with no voltage applied to the liquid crystal layer in the active retarder of Comparative Example 1. In the liquid crystal layer 160, the regions without the columnar spacers 150 have the desired cell thickness and thus can provide an appropriate phase difference (see the regions marked with a circle in the figure). The regions with the columnar spacers 150 undergo a change in cell thickness, and thus provides a small phase difference (see the region marked with a triangle in the figure) or a phase difference of zero (see the region marked with a cross in the figure). When display is provided with no voltage applied to the liquid crystal layer (black state for the left eye, white state for the right eye), the regions with an appropriate cell thickness (regions marked with a circle in the figure) achieve the desired black state and white state. The regions with a varying cell thickness (regions marked with a triangle or cross in the figure) in some cases cause light leakage in the black state or produce dark regions in the white state, due to a shift in phase difference. In contrast, in Example 1, the light-blocking components each shielding the corresponding columnar spacer 150 from light limitedly (i.e., specifically, the light-blocking parts 170 overlapping the corresponding columnar spacers 150) are disposed, so that the regions with a shift in phase difference (regions marked with a triangle or cross in FIG. 25) do not contribute to provision of display. As a result, seemingly, the balance of display quality between the left and right eyes is improved and the crosstalk phenomenon is reduced.

(Evaluation Test 2)

The crosstalk ratio of the display device of each of Example 1 and Comparative Example 1 was measured. In other words, the display (base display) provided by the image display panel 2 is set to white or black, the active retarder 1 operates for Left (bright state for the left eye, dark state for the right eye) or Right (bright state for the right eye, dark state for the left eye), and the angle-dependent luminance obtained through the polarizing glasses 4 is as shown in Table 1. Then, the crosstalk ratios are determinable from the following equations (2) and (3). The crosstalk ratios determinable from the following equations (2) and (3) each indicate the degree at which an image intended for one eye is mixed into an image intended for the other eye. The lower the crosstalk ratio, the better the display quality with a lower level of crosstalk. Table 2 shows the results. The values shown in Table 2 are the results of measurement from the front direction.

TABLE 1

| | | 3D glasses | |
|---|---|---|---|
| Base display | Retarder | Left | Right |
| White | Left | $L_{LwL}(\theta)$ | $L_{LwR}(\theta)$ |
| | Right | $L_{RwL}(\theta)$ | $L_{RwR}(\theta)$ |
| Black | Left | $B_{LL}(\theta)$ | $B_{LR}(\theta)$ |
| | Right | $B_{RL}(\theta)$ | $B_{RR}(\theta)$ |

$$\text{Right eye cross talk}(\theta) = \frac{L_{LWR}(\theta) - B_{LR}(\theta)}{L_{RWR}(\theta) - B_{RR}(\theta)} \times 100(\%) \quad (2)$$

-continued $$\text{Left eye cross talk}(\theta) = \frac{L_{RWRL}(\theta) - B_{RL}(\theta)}{L_{LWL}(\theta) - B_{LL}(\theta)} \times 100(\%) \quad (3)$$

TABLE 2

|  | Left eye crosstalk | Right eye crosstalk |
| --- | --- | --- |
| Example 1 | 0.7% | 0.7% |
| Comparative Example 1 | 3.2% | 0.7% |

As shown in Table 2, both the left and right eye crosstalk ratios in Example 1 were 0.78. In contrast, in Comparative Example 1, the left eye crosstalk ratio was as high as 3.2% while the right eye crosstalk ratio was 0.78, showing an unfavorable left-right balance. The results show that the present invention improves the balance of display quality between the left and right eyes and reduces the crosstalk phenomenon.

Example 2

An active retarder and a display device of Example 2 respectively correspond to the active retarder and the display device of Embodiment 2 (see FIG. 1, FIG. 3 to FIG. 8, and FIG. 10). An optical laminate 10 in an active retarder 1 was produced as in Example 1, except for the following points.
(Production of Upper Substrate)
All columnar spacers were the same height.
(Production of Lower Substrate)
Bases 153 were formed to be opposite to some columnar spacers. The bases 153 were formed using a transparent organic film. The bases 153 were combined with the opposite-side columnar spacers (columnar spacers formed on the upper substrate side) to serve as second spacers 152.

The display device of the present example also improves the balance of display quality between the left and right eyes and reduces the crosstalk phenomenon, and further eliminates the need for multiple types of columnar spacers on the upper substrate side, thereby simplifying the process of producing the upper substrate. The present example is advantageous also from the aspect of cell thickness control as described above.

Example 3

An active retarder and a display device of Example 3 respectively correspond to the active retarder and the display device of Embodiment 3 (see FIG. 1, FIG. 3 to FIG. 8, and FIG. 11). An optical laminate 10 in an active retarder 1 was produced as in Example 1, except for the following points.
(Production of Upper Substrate)
Columnar spacers 150 were formed using a light blocker (resin BM), and the light-blocking layer 170 and the planarization film 180 in the active retarder 1 of Example 1 were removed.

The display device of the present example also improves the balance of display quality between the left and right eyes and reduces the crosstalk phenomenon, and further simplifies the production process.

Examples 4-1 to 4-4

The long sides of a display region 1100 of a display device were each 59.6736 cm and the pixel pitch of an image display panel 2 was 77.7 µm.

An active retarder and a display device of Example 4-1 respectively correspond to the active retarder and the display device of Example 1 (Embodiment 1) (see FIG. 1 to FIG. 8). In Example 4-1, the repeating pitches of columnar spacers 150 were each 932.4 µm (see FIG. 3).

An active retarder and a display device of Example 4-2 respectively correspond to the active retarder and the display device of Embodiment 5 (see FIG. 1, FIG. 2, FIG. 4 to FIG. 8, FIG. 13, and FIG. 14). In Example 4-2, the repeating pitches of columnar spacers 150 were each 1152.1 µm, and in each repeating pitch, the columnar spacers 150 were randomly arranged (see FIG. 13).

An active retarder and a display device of Example 4-3 respectively correspond to the active retarder and the display device of Modified Example 1 of Embodiment 5 (see FIG. 1, FIG. 2, FIG. 4 to FIG. 8, FIG. 14, and FIG. 16). In Example 4-3, the repeating pitches of columnar spacers 150 were each 1474.3 µm, and in each repeating pitch, the columnar spacers 150 were randomly arranged (see FIG. 16).

An active retarder and a display device of Example 4-4 respectively correspond to the active retarder and the display device of Modified Example 2 of Embodiment 5 (see FIG. 1, FIG. 2, FIG. 4 to FIG. 8, FIG. 14, and FIG. 17). In Example 4-4, the repeating pitches of columnar spacers 150 were each 1978.0 µm, and in each repeating pitch, the columnar spacers 150 were randomly arranged (see FIG. 17).

In Examples 4-1 to 4-4, for the sake of clarity of changes in moire according to the spacer arrangement conditions, a light-blocking layer 170 overlapping the columnar spacers 150 was not disposed.

Figure 26:
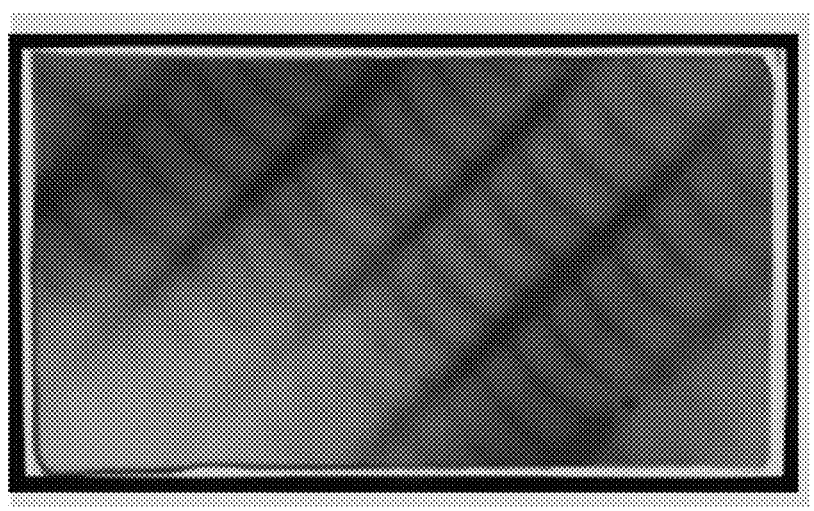
FIG. 26 is an enlarged photograph of moire observed on a display device of Example 4-1.
Figure 27:
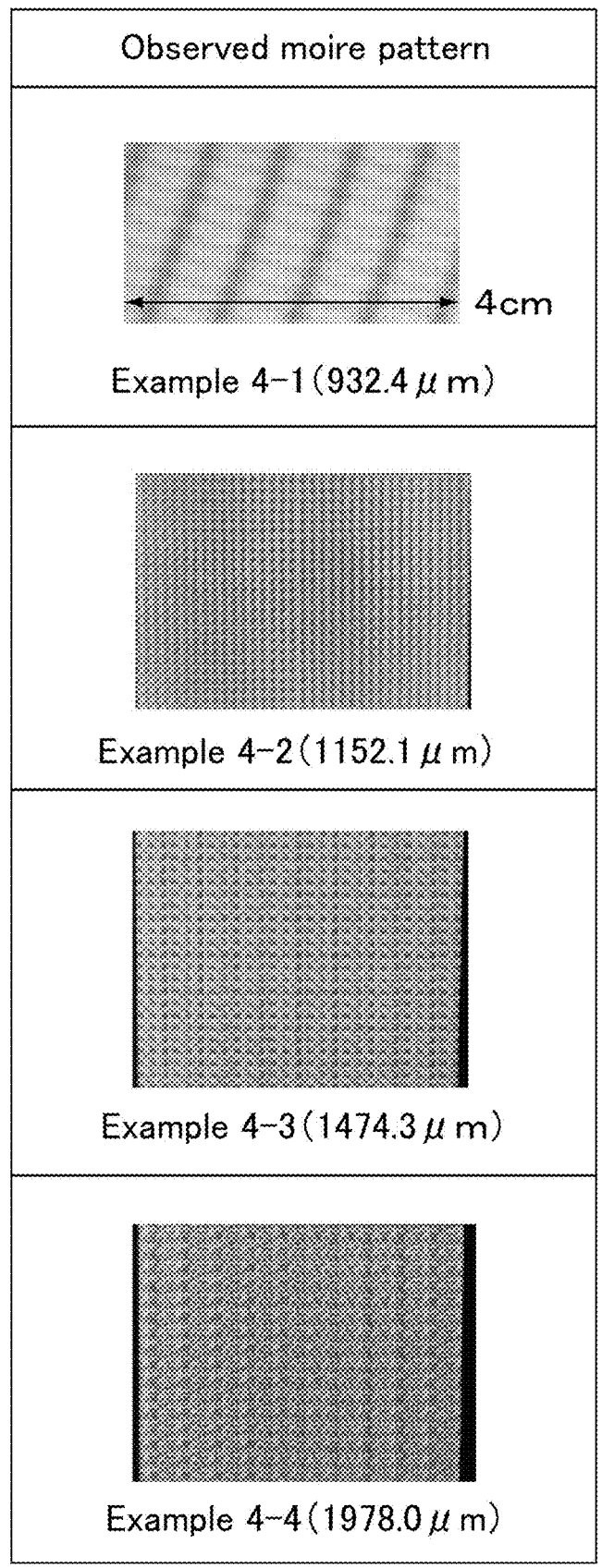
FIG. 27 shows observation photographs of moire patterns in 4-cm square views (plan views) of display devices of Examples 4-1 to 4-4.

In the display device of Example 4-1, moire was observed with no voltage applied to the liquid crystal layer of the active retarder 1 (left eye, black state). FIG. 26 is an enlarged photograph of the observed moire. The pixel pattern of the image display panel 2 is enlarged. FIG. 27 is an observation photograph of moire patterns in 4-cm square views (plan views) of the display devices of Examples 4-1 to 4-4. In FIG. 27, the numerical value in the parenthesis is the length of one side of each repeating unit, i.e., a repeating pitch (µm).

FIG. 27 shows that less moire was observed in Examples 4-2 to 4-4, and the moire pattern was further segmentized to be less noticeable especially in Example 4-3 and Example 4-4. The characteristic arrangement (i.e., random arrangement in a repeating pitch) of the columnar spacers 150 as in Examples 4-2 to 4-4 enables sufficient reduction of moire.

The results also show that in the configurations of Examples 4-1 to 4-4, provision of the light-blocking layer 170 overlapping the columnar spacers 150 improves the display balance for the left and right eyes to further improve the display quality.

Examples 5-1, 5-2

A display device of Example 5-1 is the same as the display device of Example 4-1 (Example 1), except that an active retarder 1 and an image display panel 2 are attached to each other using an optically clear adhesive (OCA) as a light diffusing adhesive layer 5.

A display device of Example 5-2 is the same as the display device of Example 4-4, except that an active retarder 1 and an image display panel 2 are attached to each other using an optically clear adhesive (OCA) as a light diffusing adhesive layer 5.

Figure 28:
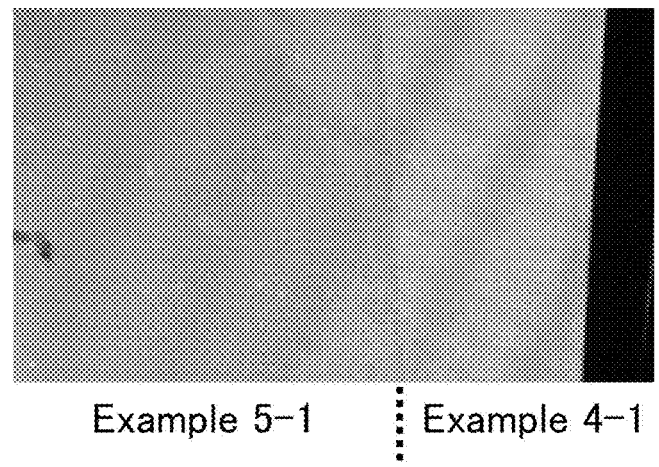
FIG. 28 shows the results of comparison between occurrence and non-occurrence of moire in the display device of Example 4-1 and a display device of Example 5-1.

The occurrence of moire was compared between the display device of Example 4-1 and the display device of Example 5-1. FIG. 28 shows the results. The results show that use of the light diffusing adhesive layer 5 makes moire less noticeable.

Figure 29:
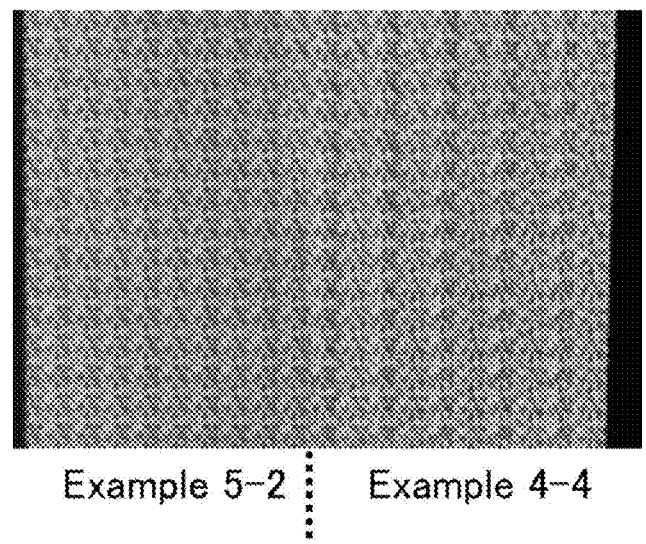
FIG. 29 shows the results of comparison between occurrence and non-occurrence of moire in the display device of Example 4-4 and a display device of Example 5-2.

The occurrence of moire was compared between the display device of Example 4-4 and the display device of Example 5-2. FIG. 29 shows the results. While the display device of Example 4-4 reduces moire sufficiently, use of the light diffusing adhesive layer 5 makes moire even less noticeable to be invisible to human eyes.

Example 6

Figure 30:
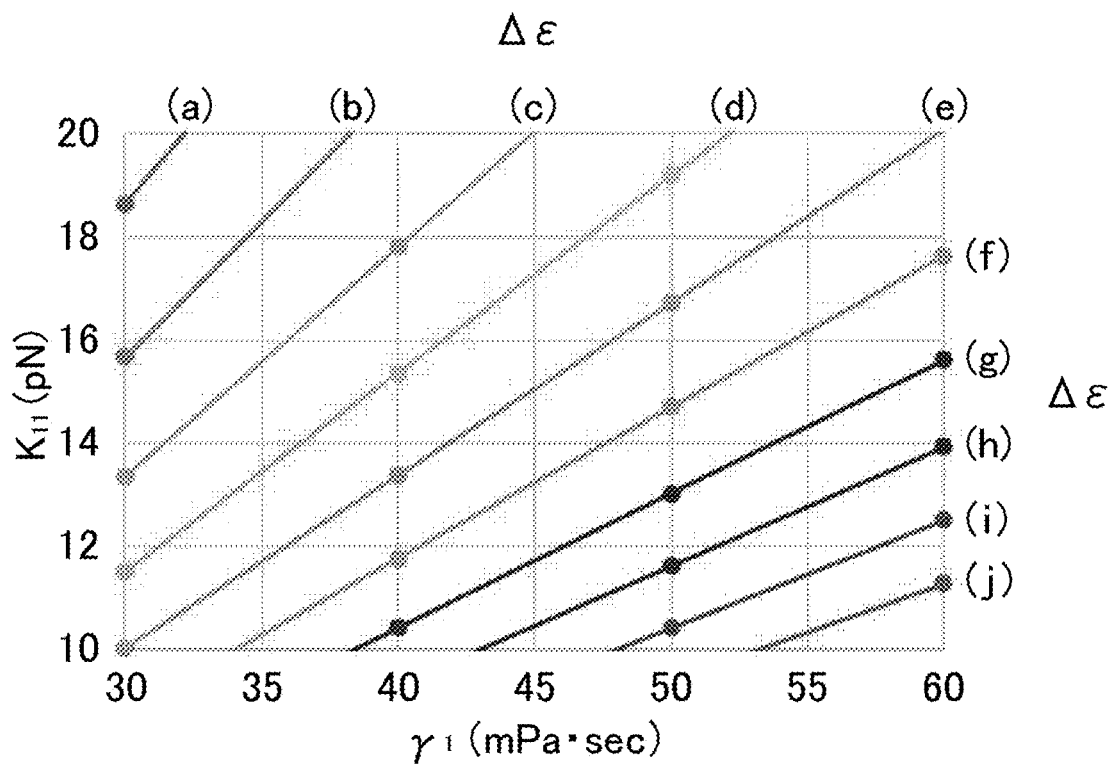
FIG. 30 is a graph of rotational viscosity coefficient $\gamma_1$ versus splay elastic constant $K_{11}$ for liquid crystal molecules (a) to (j) having an anisotropy of dielectric constant $\Delta\varepsilon$ of from 0.11 to 0.2.
Figure 31:
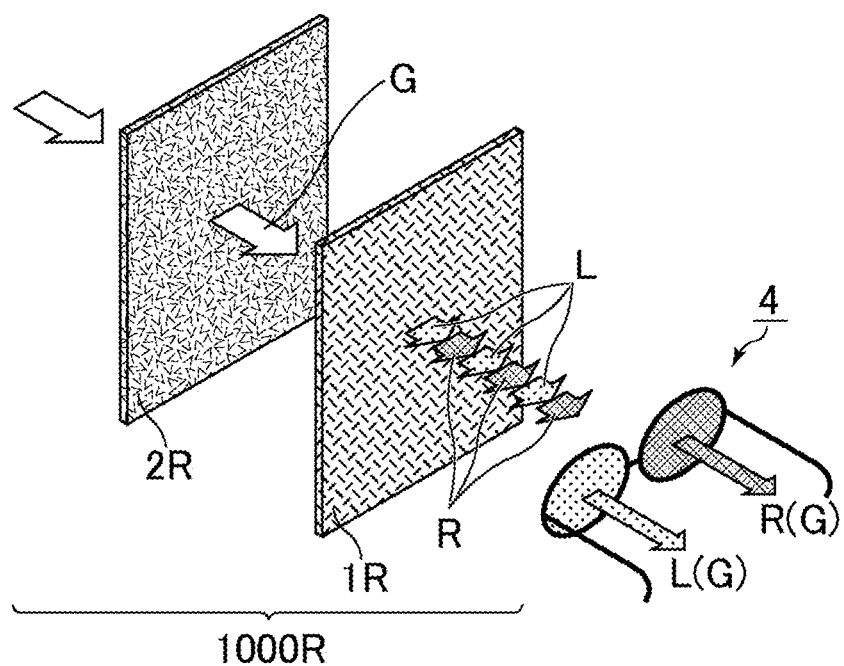
FIG. 31 is a schematic view of the mechanism in which a conventional active retarder-type display device for 3D images enables observation of images.

Example 6 is an example obtained by varying the anisotropy of dielectric constant $\Delta\varepsilon$ of the liquid crystal molecules to 0.11, 0.12, 0.13, 0.14, 0.15, 0.16, 0.17, 0.18, 0.19, and 0.2 in the active retarder of Example 1. The example in which $\Delta\varepsilon=0.16$ ((f) in FIG. 30) corresponds to Example 1 (Example 4-1). FIG. 30 is a graph of rotational viscosity coefficient $\gamma_1$ versus splay elastic constant $K_{11}$ of liquid crystal molecules with anisotropies of dielectric constant $\Delta\varepsilon$ of (a) 0.11, (b) 0.12, (c) 0.13, (d) 0.14, (e) 0.15, (f) 0.16, (g) 0.17, (h) 0.18, (i) 0.19, and (j) 0.2. In FIG. 30, the horizontal axis represents the rotational viscosity coefficient $\gamma_1$ (mPa·sec) of a liquid crystal material, and the vertical axis represents the splay elastic constant $K_{11}$ (pN) of the liquid crystal molecules.

For example, in the case of liquid crystal molecules with $\Delta\varepsilon=0.16$, in FIG. 30, the more preferred range for the active retarder is the range of a pentagon defined by: a line segment (i.e., y-axis) between the coordinates ($\gamma_1=30$, $K_{11}=20$) and the coordinates ($\gamma_1=30$, $K_{11}=10$); a line segment between the coordinates ($\gamma_1=30$, $K_{11}=10$) and the coordinates ($\gamma_1=\gamma_1$ value on straight line (f) when $K_{11}$ is 10, $K_{11}=10$); a straight line (f); a line segment between the coordinates ($\gamma_1=60$, $K_{11}=K_{11}$ value on straight line (f) when $\gamma_1$ is 60) and the coordinates ($\gamma_1=60$, $K_{11}=20$); and a line segment (i.e., upper x-axis) between the coordinates ($\gamma_1=60$, $K_{11}=20$) and the coordinates ($\gamma_1=30$, $K_{11}=20$). In other words, in the case of liquid crystal molecule with $\Delta\varepsilon=0.16$, $\gamma_{11}$ and $K_{11}$ are suitably values falling within the pentagon range. In the case of liquid crystal molecules with $\Delta\varepsilon=0.14$, in FIG. 30, the more preferred range for the active retarder is the range of a triangle defined by: a line segment between the coordinates ($\gamma_1=30$, $K_{11}=20$) and the coordinates ($\gamma_1=30$, $K_{11}=K_{11}$ value on straight line (d) when $\gamma_1$ is 30); a straight line (d); and a line segment between the coordinates ($\gamma_1=\gamma_1$ value on straight line (d) when $K_{11}$ is 20, $K_{11}=20$) and the coordinates ($\gamma_1=30$, $K_{11}=20$). In other words, in the case of liquid crystal molecules with $\Delta\varepsilon=0.14$, Yu and $K_{11}$ are suitably values falling within the triangle range.

The active retarder requires ultrafast response as it is required to execute switching in response to fast image switching. The active retarder of the present example is in the vertical electric field-type ECB mode using positive liquid crystals, and involves an issue of switching from the voltage-on state to the voltage-off state in some cases. In the present mode, the response speed in the voltage-off state is typically calculated from the following equation (4):

$$\tau d = \gamma_1 \times d^2 / (\pi^2 \times K_{11}) \qquad (4)$$

wherein $\tau$ represents the response time from the voltage-on state to the voltage-off state (unit: milliseconds (ms)); $\gamma_1$ represents the rotational viscosity coefficient (mPa·sec) of the liquid crystal material; d represents the thickness (cell thickness; unit: μm) of the liquid crystal layer; and $K_{11}$ represents the splay elastic constant (pN) of the liquid crystal molecules.

Variables were extracted from the equation (4), and d is replaced with (1/$\Delta\varepsilon$) on the assumption that the phase difference And is a constant, so that an index value ($\gamma_1/\{K_{11}\times(\Delta\varepsilon)^2\}$) related to response can be obtained. For example, the liquid crystal material used in Example 1 had $\gamma_1$ of 48 (mPa·sec), $\Delta\varepsilon$ of 0.16, and $K_{11}$ of 14.1 (pN) at a measurement temperature of 20° C., which satisfy the following equation (5).

$$\gamma_1/\{K_{11}\times(\Delta\varepsilon)^2\} = 1.3\times10^{11} \qquad (5)$$

The results of Example 1 in Evaluation Test 1 show that a crosstalk ratio of 0.78, obtained using the present liquid crystal material, was sufficient in providing the desired 3D display. Thus, the liquid crystal material having a crosstalk ratio equal to or lower than the index value obtained herein, i.e., a liquid crystal material satisfying the following inequality (1), is more suitable as a liquid crystal material for active retarders.

$$K_{11} \geq \gamma_1/\{(\Delta\varepsilon)^2\times1.3\times10^{11}\} \qquad (1)$$

The embodiments of the present invention described above may be combined as appropriate within the gist of the present invention.

REFERENCE SIGNS LIST

1, 1R: active retarder
2, 2R: image display panel
3: backlight
4: polarizing glasses
5: light diffusing adhesive layer
10, 10R, 11, 12: optical laminate
20: phase difference plate
40: polarizing plate
41, 42: phase difference plate
61: torque meter
62: glass fiber
63: glass tube for NMR
64: sample
65: magnet
111, 112: substrate
121, 122: electrode
131, 132: insulating film
141, 142: alignment film
150, 151, 152: columnar spacer
153: base
160: liquid crystal layer
170: light-blocking part, light blocker
180: planarization film
211, 212: substrate
231, 232: polarizing plate
240, 240B, 240G, 240R: color filter layer
250: black matrix layer
260: liquid crystal layer
1000, 1000R: display device
1100: display region
1200: frame region
1601: liquid crystal molecule A: long side of display region
B: pixel pitch
G: image
R (G): image intended for right eye
L (G): image intended for left eye
s: in-plane slow axis
t: transmission axis

What is claimed is:

1. An active retarder for a three-dimensional (3D) image display, the active retarder comprising:
an optical laminate that comprises:
a pair of substrates;
a pair of electrodes disposed between the pair of substrates;
a liquid crystal layer formed from a liquid crystal material containing liquid crystal molecules;
columnar spacers; and
light-blocking components, each shielding a corresponding columnar spacer, among the columnar spacers, from light,
wherein the light-blocking components are arranged in a dot pattern in a plan view correspondingly to the columnar spacers that are arranged in a dot pattern in the plan view,
each of the light-blocking components overlaps and is located above the corresponding columnar spacer, and
only the light-blocking components are capable of blocking the light.

2. The active retarder according to claim 1,
wherein the light-blocking components comprise light-blocking parts each overlapping the corresponding columnar spacer in the plan view.

3. A display device comprising:
an image display panel including pixels; and
the active retarder according to claim 2.

4. The active retarder according to claim 1,
wherein the columnar spacers include at least one of a columnar spacer having a circular shape in the plan view and a columnar spacer having a rounded rectangular shape in the plan view.

5. The active retarder according to claim 1,
wherein the columnar spacers are arranged randomly.

6. The active retarder according to claim 1,
wherein the columnar spacers are formed on a side of one of the pair of substrates, and the columnar spacers comprise:
a first spacer disposed in a state that, in a cross-sectional view, the liquid crystal layer is present between the first spacer and the other one of the pair of substrates, and
a second spacer other than the first spacer.

7. The active retarder according to claim 1,
wherein, in the plan view, unit regions with the same arrangement pattern of the columnar spacers are disposed with constant repeating pitches.

8. The active retarder according to claim 1,
wherein the liquid crystal molecules satisfy the following inequality (1):

$$K_{11} \geq \gamma_1 / \{(\Delta\varepsilon)^2 \times 1.3 \times 10^{11}\} \tag{1}$$

where $K_{11}$ represents a splay elastic constant (pN) of the liquid crystal molecules; $\gamma_1$ represents a rotational viscosity coefficient (mPa·sec) of the liquid crystal material; and $\Delta\varepsilon$ represents an anisotropy of dielectric constant of the liquid crystal molecules.

9. The active retarder according to claim 1,
wherein the active retarder is driven in an electrically controlled birefringence (ECB) mode.

10. A display device comprising:
an image display panel including pixels; and
the active retarder according to claim 1.

11. The display device according to claim 10, further comprising a backlight.

12. The display device according to claim 10,
wherein a light diffusing adhesive layer is disposed between the image display panel and the active retarder.

13. The display device according to claim 10,
wherein the image display panel is configured to sequentially display an image intended for a right eye and an image intended for a left eye by time-based switching, and
the active retarder is configured to control an application of voltage to the liquid crystal layer in synchronization with the time-based switching and to change a polarization state of light between the image intended for the right eye and the image intended for the left eye.

14. The display device according to claim 13,
wherein the display device is configured to display one of the image intended for the right eye and the image intended for the left eye in a normally white mode and to display the other one of the image intended for the right eye and the image intended for the left eye in a normally black mode.

15. A display device comprising:
an image display panel including pixels; and
an active retarder for a three-dimensional (3D) image display, the active retarder comprising:
an optical laminate that comprises:
a pair of substrates;
a pair of electrodes disposed between the pair of substrates;
a liquid crystal layer formed from a liquid crystal material containing liquid crystal molecules;
columnar spacers; and
light-blocking components, each shielding a corresponding columnar spacer, among the columnar spacers, from light,
wherein the light-blocking components are arranged in a dot pattern in a plan view correspondingly to the columnar spacers that are arranged in a dot pattern in the plan view,
in the plan view, unit regions with the same arrangement pattern of the columnar spacers are disposed with constant repeating pitches, and
a length of a pitch included in the constant repeating pitches and parallel to a long side A of a display region of the display device is not an integer multiple of a length of a pitch included in pixel pitches of the image display panel and parallel to the long side A.

16. A display device comprising:
an image display panel including pixels; and
an active retarder for a three-dimensional (3D) image display, the active retarder comprising:
an optical laminate that comprises:
a pair of substrates;
a pair of electrodes disposed between the pair of substrates;
a liquid crystal layer formed from a liquid crystal material containing liquid crystal molecules;

columnar spacers; and
light-blocking components, each shielding a corresponding columnar spacer, among the columnar spacers, from light,
wherein the light-blocking components are arranged in a dot pattern in a plan view correspondingly to the columnar spacers that are arranged in a dot pattern in the plan view,
the image display panel has a black matrix layer disposed in a grid pattern in the plan view, and
at least one of the light-blocking components, referred to as a first light-blocking component, does not overlap the black matrix layer.

17. The display device according to claim 16, wherein at least another one of the light-blocking components, referred to as a second light-blocking component, overlaps the black matrix layer.

* * * * *